(12) United States Patent
Machida et al.

(10) Patent No.: US 8,742,061 B2
(45) Date of Patent: Jun. 3, 2014

(54) POLYARYLENE SULFIDE FILM

(71) Applicant: Toray Industries, Inc., Tokyo (JP)

(72) Inventors: Tetsuya Machida, Osaka (JP);
Yasuyuki Imanishi, Shiga (JP);
Masatoshi Ohkura, Shiga (JP); Takuji Higashioji, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/720,862

(22) Filed: Dec. 19, 2012

(65) Prior Publication Data

US 2013/0310503 A1  Nov. 21, 2013

Related U.S. Application Data

(62) Division of application No. 12/084,063, filed as application No. PCT/JP2006/321089 on Oct. 24, 2006, now abandoned.

(30) Foreign Application Priority Data

Oct. 27, 2005 (JP) ................. 2005-312470
Nov. 25, 2005 (JP) ................. 2005-339816

(51) Int. Cl.
*C08G 75/14* (2006.01)

(52) U.S. Cl.
USPC .......... 528/388; 528/488; 528/489; 528/499; 528/373; 525/537; 525/425; 525/493; 428/220

(58) Field of Classification Search
USPC .......... 528/388, 488, 489, 499, 373; 525/537, 525/425, 493; 428/220
See application file for complete search history.

(56) References Cited

U.S. PATENT DOCUMENTS

| 4,749,598 A | 6/1988 | Miles |
| 5,223,585 A | 6/1993 | Mizuno et al. |
| 5,294,660 A | 3/1994 | Deguchi et al. |

FOREIGN PATENT DOCUMENTS

| JP | 62-154998 A | 7/1987 |
| JP | 62-263797 A | 11/1987 |
| JP | 63-260426 A | 10/1988 |
| JP | 64-67099 A | 3/1989 |
| JP | 4-68839 A | 3/1992 |
| JP | 5-30591 A | 2/1993 |
| JP | 6-305019 A | 11/1994 |
| JP | 2001-261959 A | 9/2001 |
| JP | 2001-328161 A | 11/2001 |
| JP | 2006-137852 A | 6/2006 |
| JP | 2006-199734 A | 8/2006 |

*Primary Examiner* — Shane Fang

(74) *Attorney, Agent, or Firm* — Birch, Stewart, Kolasch & Birch, LLP

(57) ABSTRACT

It is aimed to provide a polyarylene sulfide film for an acoustic instrument vibrating plate excellent in heat resistance, molding processability, acoustic properties, and also heat moldability. Provided is a polyarylene sulfide film wherein the elongation at break in either a longitudinal direction or a width direction of the film is 100% or more and 250% or less, and the Young's modulus in either a longitudinal direction or a width direction of the film is 1.5 GPa or more and less than 4 GPa.

8 Claims, 1 Drawing Sheet

POLYARYLENE SULFIDE FILM

CROSS REFERENCE WITH PCT APP

The present application is a 37 C.F.R. §1.53(b) divisional of, and claims priority to, U.S. application Ser. No. 12/084,063, filed Apr. 24, 2008. Application Ser. No. 12/084,063 is the national phase under 35 U.S.C. §371 of International Application No. PCT/JP2006/321089, filed on Oct. 24, 2006. Priority is also claimed to Japanese Application No. 2005-312470 filed on Oct. 27, 2005 and Japanese Application No. 2005-339816 filed on Nov. 25, 2005. The entire contents of each of these applications is hereby incorporated by reference.

TECHNICAL FIELD

The present invention relates to a polyarylene sulfide film for an acoustic instrument vibrating plate constituting various kinds of acoustic instruments i.e., speakers, and relates to a polyarylene sulfide film excellent in heat moldability.

BACKGROUND ART

Conventionally, as an acoustic instrument vibrating plate made of plastic, there have been used acoustic instrument vibrating plates made of polyethylene terephthalate (PET) film, and also polyethylene naphthalate (PEN) or polyetherimide (PEI) having better heat resistance and rigidity than PET (see Patent documents 1, 2, and 3).

However, in the case where an acoustic instrument vibrating plate using PET is employed in a speaker of a small diameter, for example, for a cellular phone, thermal deformation easily occurs in an atmosphere at 65° C. or more, and heat resistance is not sufficient. On the other hand, an acoustic vibrating plate of PEN is better in heat resistance than a vibrating plate made of PET but still not sufficient in heat resistance. Further, regarding an acoustic vibrating plate of PEI, there have been problems that acoustic properties are deteriorated depending on a shape of speaker vibrating plate, and breakage of film occurs due to not withstanding a larger external power output. Therefore, an acoustic vibrating plate made of polyphenylene sulfide (PPS) excellent in heat resistance and mechanical properties has been proposed (Patent document 4), but moldability is not sufficient, there has been a problem that a film is broken in heat molding. Further, a film made of PPS and polyetherimide has been proposed (Patent document 5), but moldability is not sufficient and there has been a problem that a film is broken in heat molding.

Patent document 1: Japanese Unexamined Patent Publication No. 1-67099
Patent document 2: Japanese Unexamined Patent Publication No. 62-263797
Patent document 3: Japanese Examined Patent Publication No. 4-68839
Patent document 4: Japanese Unexamined Patent Publication No. 6-305019
Patent document 5: Japanese Unexamined Patent Publication No. 2001-261959

DISCLOSURE OF THE INVENTION

Problem to be Solved by the Invention

The present invention is based on the finding of a film for a speaker vibrating plate capable of solving these problems, specifically, to provide a polyarylene sulfide film having excellent heat resistance, molding processability and acoustic properties, and further a polyarylene sulfide film excellent in heat moldability.

Means to Solve the Problem

The present invention has the following constitutions to solve the above-described problem.
Namely,
(1) A polyarylene sulfide film wherein the elongation at break in either a longitudinal direction or a width direction of the film is 100% or more and 250% or less, and the Young's modulus in either a longitudinal direction or a width direction of the film is 1.5 GPa or more and less than 4 GPa.
(2) The polyarylene sulfide described in (1), wherein the elongation at break in both a longitudinal direction and a width direction of the film is 100% or more and 250% or less, and the Young's modulus in both a longitudinal direction and a width direction of the film is 1.5 GPa or more and less than 4 GPa.
(3) The polyarylene sulfide film described in (1), wherein the thickness of the film is 3 μm or more and 100 μm or less.
(4) The polyarylene sulfide film described in (1), comprising a thermoplastic resin (Y) other than polyarylene sulfide, wherein the content of the thermoplastic resin (Y) is 1 to 40 parts by weight when the sum of contents of the polyarylene sulfide and the thermoplastic resin (Y) is 100 parts by weight.
(5) The polyarylene sulfide film described in (1), comprising an inert particle by 0.1 to 30 parts by weight relative to 100 parts by weight in total of polymers constituting the film.
(6) The polyarylene sulfide film described in (4), comprising an inert particle by 0.6 to 30 parts by weight relative to 100 parts by weight in total of polymers constituting the film, and a thermoplastic resin (Y) other than polyarylene sulfide by 1 to 40 parts by weight relative to 100 parts by weight in total of polymers constituting the film.
(7) The polyarylene sulfide film described in (5), wherein the particle diameter of the inert particle is 0.1 μm or more and 3 μm or less.
(8) The polyarylene sulfide film described in (5), wherein the inert particle is at least one kind selected from the group consisting of calcium carbonate and silica.
(9) The polyarylene sulfide film described in (4), wherein the thermoplastic resin (Y) is at least one kind selected from the group consisting of polyamide, polyetherimide, polysulfone and polyether sulfone.
(10) The polyarylene sulfide film described in (4), wherein the average dispersion diameter of the thermoplastic resin (Y) is 0.01 to 2 μm.
(11) The polyarylene sulfide film described in (4), wherein the average dispersion diameter of the thermoplastic resin (Y) is 0.05 to 0.5 μm.
(12) The polyarylene sulfide film described in (1), wherein the polyarylene sulfide is polyphenylene sulfide.
(13) The polyarylene sulfide film described in (1), which is a film for heat molding.
(14) The polyarylene sulfide film described in (1), which is a film for an acoustic instrument vibrating plate.
(15) The polyarylene sulfide film described in (1), wherein the glass transition temperature thereof is observed at 85° C. or more to less than 95° C., and not observed at 95° C. or more to 130° C. or less.
(16) The polyarylene sulfide film described in (4), comprising a silicon atom constituting a siloxane bond in an interface of a dispersed phase composed of the thermoplastic resin A.
(17) A method of producing the polyarylene sulfide film described in (1), comprising the step of subjecting a resin composition obtained by kneading raw materials comprising polyarylene sulfide, thermoplastic resin A, and 0.1 to 10 parts by weight of a compatible plasticizer having at least one kind of group selected from the group consisting of an epoxy group, an amino group and an isocyanate group to a melt film-forming.

Effect of the Invention

According to the present invention, as explained below, it is possible to obtain a polyarylene sulfide film excellent in heat resistance, molding processability and acoustic properties, further a polyarylene sulfide film excellent in heat moldability.

DESCRIPTION OF NUMBER AND SYMBOL

Figure 1:
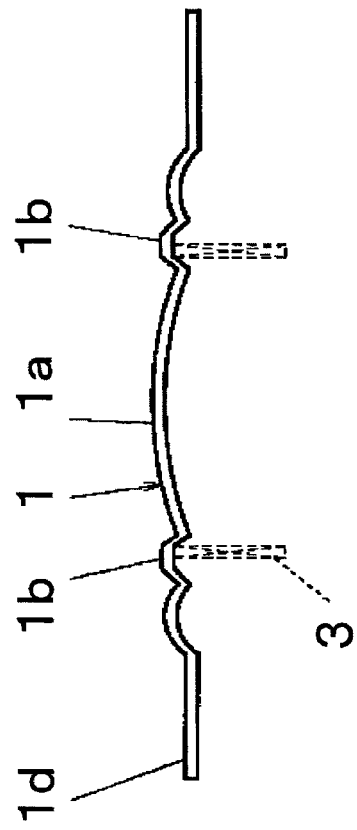
FIG. 1 is a cross sectional view showing an Example of an acoustic instrument vibrating plate using the present invention.

1. Acoustic instrument vibrating plate
1a. Dome part of acoustic instrument vibrating plate
1b. Concave part of acoustic instrument vibrating plate
1c. Peripheral part of acoustic instrument vibrating plate
1d. External attaching part of acoustic instrument vibrating plate
2. Speaker equipped with acoustic instrument vibrating plate
3. Voice coil
4. Upside magnetic pole plate of speaker
5. Downside magnetic pole plate of speaker
6. Magnetic space
7. External element of speaker
8. Gasket
9. Magnet of speaker
10. Magnetic circuit of speaker
11. Frame
12. Protector

BEST MODE FOR CARRYING OUT THE INVENTION

Hereinafter, polyarylene sulfide films of the present invention will be explained. The polyarylene sulfide film of the present invention is excellent in heat resistance, moldability, acoustic properties, and particularly heat moldability. To exhibit these characteristics, in the present invention, it is necessary that the elongation at break in either a longitudinal direction or a width direction of the film is 100% or more and 250% or less. A more preferable range of the elongation at break is 110% or more and 230% or less, a further preferable range is 120% or more and 210% or less. When the elongation at break is less than 100%, a film is sometimes torn or broken in processing into a speaker vibrating plate. On the other hand, when the elongation at break exceeds 250%, it is necessary to make a draw ratio in film-forming extremely low, there arise problems that unevenness of quality generates in a width direction of a film and acoustic properties are lowered. To set an elongation at break of a film in the range of the present invention, a draw ratio in a longitudinal direction or width direction in producing a film is 2.2 to 5, preferably 2.4 to 4.5, further preferably 2.6 to 4, and most preferably 3.0 to 3.5. Further, heat-set of this stretched film under extension or relaxing in a width direction tends to obtain the effect of the present invention. Further, other than film-forming conditions, the effect of the present invention is more easily obtained in such manner that a thermoplastic resin (Y) other than polyarylene sulfide is contained in a preferable range of the present invention.

Further, the polyarylene sulfide film of the present invention has the Young's modulus in either a longitudinal direction or a width direction of the film of 1.5 GPa or more and less than 4 GPa. A more preferable range of Young's modulus is 1.7 GPa or more and less than 3.8 GPa, and further preferable range is 1.9 GPa or more and less than 3.6 GPa. A film with Young's modulus of less than 1.5 Gpa tends to become uneven in film thickness, and since the film easily deforms in handling, handling the film becomes difficult. On the other hand, when the Young's modulus exceeds 4 Gpa, a film is sometimes torn or broken in processing into a speaker vibrating plate, there is a case that acoustic properties are deteriorated. To set the Young's modulus of a film in the range of the present invention, a draw ratio in a longitudinal direction and width direction in producing a film is 2.2 to 5, preferably 2.4 to 4.5, further preferably 2.6 to 4, and most preferably 3.0 to 3.5. Further, heat-set of this stretched film under extension or relaxing in a width direction tends to obtain the effect of the present invention.

Further, the polyarylene sulfide film of the present invention is a preferable aspect from the viewpoint of further improving moldability when the elongation at break in both a longitudinal direction and a width direction of the film is 100% or more and 250% or less. A more preferable range of the elongation at break is 110% or more and 230% or less, a further preferable range is 120% or more and 210% or less. When the elongation at break is less than 100%, a film is sometimes torn or broken in processing into a speaker vibrating plate. On the other hand, when the elongation at break exceeds 250%, it is necessary to make a draw ratio in film-forming extremely low, there arise problems that unevenness of quality generates in a width direction of a film and acoustic properties are lowered. To set an elongation at break of a film in the range of the present invention, a draw ratio in a longitudinal direction and width direction in producing a film is 2.2 to 5, preferably 2.4 to 4.5, further preferably 2.6 to 4, and most preferably 3.0 to 3.5. Further, heat-set of this stretched film under extension or relaxing in a width direction tends to obtain the effect of the present invention. Further, other than film-forming conditions, the effect of the present invention is more easily obtained in such manner that a thermoplastic resin (Y) other than polyarylene sulfide is contained in a preferable range of the present invention.

Further, the polyarylene sulfide film of the present invention has the Young's modulus in both a longitudinal direction and a width direction of the film of 1.5 GPa or more and less than 4 GPa from the viewpoint of further improving moldability. A more preferable range of Young's modulus is 1.7 GPa or more and less than 3.8 GPa, and further preferable range is 1.9 GPa or more and less than 3.6 GPa. A film with Young's modulus of less than 1.5 Gpa tends to become uneven in film thickness, and since the film easily deforms in handling, handling the film becomes difficult. On the other hand, when the Young's modulus exceeds 4 Gpa, there is a case that acoustic properties are deteriorated.

As the polyarylene sulfide of the present invention, there can be used a homopolymer or copolymer having a repeating unit of —(Ar—S)—. As the Ar, a unit expressed by the following formulas (A) to (K) can be mentioned.

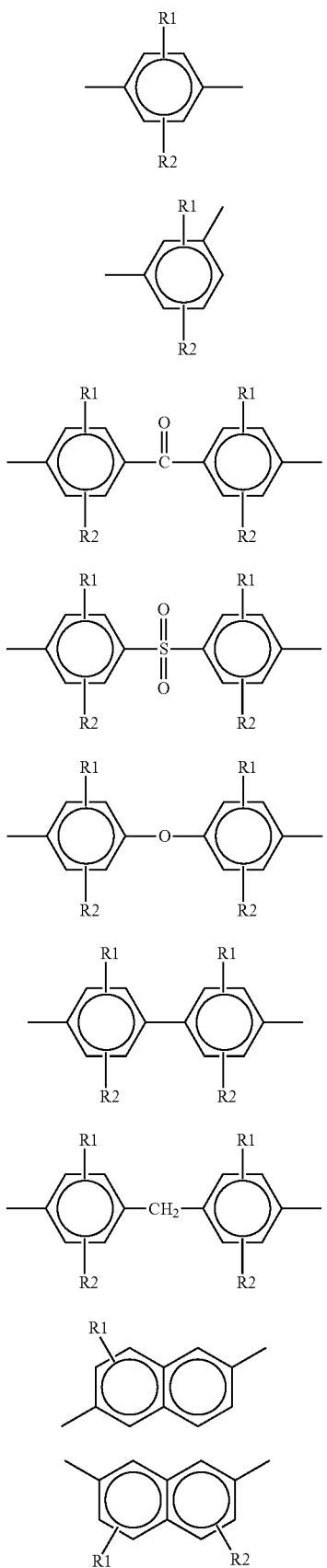

(A)
(B)
(C)
(D)
(E)
(F)
(G)
(H)
(I)

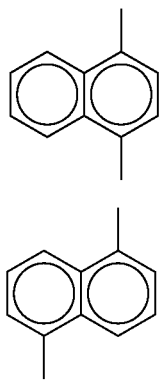

(J)

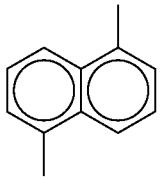

(K)

wherein R1 and R2 are substituents selected from hydrogen, an alkyl group, an alkoxy group and a halogen group, R1 and R2 may be the same or different.

As the repeating unit of polyarylene sulfide used in the present invention, a structural formula expressed by the above-described formula (A) is preferable, and typical examples thereof include polyphenylene sulfide, polyphenylene sulfide sulfone, polyphenylene sulfide ketone, random copolymer and block copolymer thereof, and a mixture thereof. In particular, as a preferable polyarylene sulfide, polyphenylene sulfide (PPS) is preferably exemplified from the viewpoints of property of film and economic efficiency of film, it is a resin containing preferably 80 mol % or more of p-phenylene sulfide unit as a major constitutional unit of a polymer shown in the following structural formula, more preferably 90 mol % or more. When such p-phenylene sulfide component is less than 80%, crystallizability, glass transition temperature and the like are low, and heat resistance, dimensional stability, mechanical characteristic, dielectric characteristic and the like characterized by PPS are sometimes damaged.

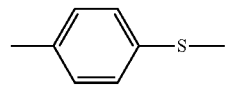

In the above-described PPS resin, when it may contain a unit of other copolymerizable sulfide bond as long as which is less than 20 mol % of repeating units, preferably less than 10 mol %. As the repeating unit of less than 20 mol % of repeating units, preferably less than 10 mol %, for example, there are exemplified a three-functional group, an ether unit, a sulfone unit, a ketone unit, a meta-bond unit, an aryl group having a substituent group such as an alkyl group, a biphenyl unit, a ter-phenylene unit, a vinylene unit and a carbonate unit, as a specific example, the following structural units can be mentioned. It is possible to be constituted by at least one or two among them. In this case, the constitutional unit may be from any copolymerization method of a random type or block type.

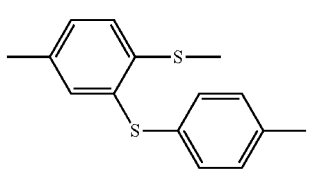

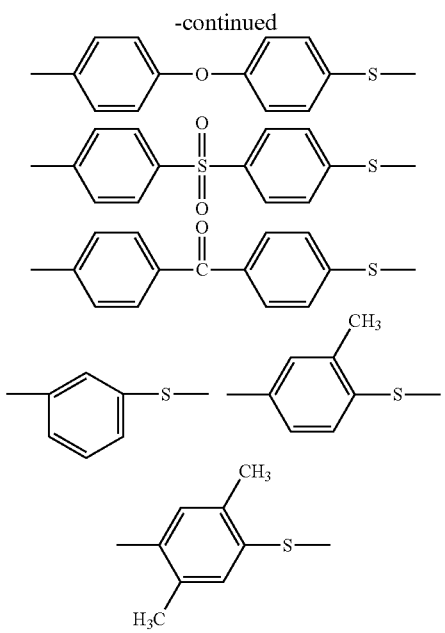

The melt viscosity of PPS resin is not particularly limited as long as it can provide melt-kneading, it is preferably in a range of 100 to 2,000 Pa·s under a shear rate of 1,000 (1/sec) at a temperature of 315° C., and more preferably in a range of 200 to 1,000 Pa·s.

PPS resin for the present invention can be produced by various methods, for example, a method for obtaining a polymer having a relatively small molecular weight described in Japanese Examined Patent Publication No. 45-3368, or a method for obtaining a polymer having a relatively large molecular weight described in Japanese Examined Patent Publication No. 52-12240 and Japanese Unexamined Patent Publication No. 61-7332.

In the present invention, the PPS resin obtained can be used after being conducted by various treatments such as crosslinking/molecular weight heightening by heating in air; heat treatment under inert gas atmosphere such as nitrogen or reduced pressure; wash with an organic solvent, hot water and aqueous acid solution; and activation by a compound having a functional group such as acid anhydride, amine, isocyanate and functional disulfide compound.

Next, the production method of PPS resin is exemplified, but the present invention is not limited thereto.

For example, sodium sulfide and p-dichlorobenzene are reacted in an amide based polar solvent such as N-methyl-2-pyrrolidone (NMP) under high temperature and high pressure. If necessary, a copolymerizable component such as trihalobenzene can be contained. As a polymerization degree adjusting agent, caustic potash or alkali metal carboxylate is added and a mixture is subjected to polymerization reaction at 230 to 280° C. After polymerization, a polymer is cooled, the polymer is made into an aqueous slurry and filtered to obtain a granular polymer. This polymer is stirred in aqueous solution of acetate or the like at 30 to 100° C. for 10 to 60 minutes, washed with ion-exchanged water at 30 to 80° C. several times, and dried to obtain PPS powders. The powdery polymer is washed with NMP at an oxygen partial pressure of 10 torrs or less, preferably 5 torrs or less, then washed with ion-exchanged water at 30 to 80° C. several times, and dried under a reduced pressure of 5 torrs or less. The thus obtained polymer is a substantially liner PPS polymer, thus it can be subjected to a stable stretching film-forming. Apparently, if necessary, there may be added other polymeric compounds, inorganic and organic compounds such as silicon oxide, magnesium oxide, calcium carbonate, titanium oxide, aluminum oxide, crosslinked polyester, crosslinked polystyrene, mica, talc and kaolin, heat decomposition preventing agent, heat stabilizer and antioxidant.

As a specific method in the case of the crosslinking/molecular weight heightening by heating a PPS resin, it can be exemplified a method of carrying out heating under an oxidative atmosphere such as air and oxygen, or under a mixed gas atmosphere of the oxidative atmosphere and an inert gas such as nitrogen and argon in a heating container at a predetermined temperature until obtaining a desired melt viscosity. The heat treatment temperature is ordinarily selected at 170 to 280° C., more preferably 200 to 270° C., and the heat treatment time is ordinarily selected for 0.5 to 100 hours, more preferably for 2 to 50 hours, by controlling these two, a resin having a target melt viscosity can be obtained. As apparatus for the heat treatment, it may be an ordinary hot-air dryer, or a heating apparatus in rotary type or with agitating blades, to perform an efficient and uniform treatment, it is preferable to use a heating apparatus in rotary type or with agitating blades.

As a specific method for heat treatment of PPS resin under an inert gas atmosphere such as nitrogen or reduced pressure, there can be exemplified a method for heat treatment that, under an inert gas atmosphere such as nitrogen or reduced pressure, the heat treatment temperature is 150 to 280° C., more preferably 200 to 270° C., and the heat treatment time is 0.5 to 100 hours, more preferably for 2 to 50 hours. As apparatus for the heat treatment, it may be an ordinary hot-air dryer, or a heating apparatus in rotary type or with agitating blades, to perform an efficient and more uniform treatment, it is preferable to use a heating apparatus in rotary type or with agitating blades. The PPS resin used in the present invention is preferably a substantially linear PPS without heightening a molecular weight by thermal oxidation-crosslinking treatment to achieve the aim at improving an elongation at break.

The PPS resin used in the present invention is preferably a PPS resin that deionization treatment is conducted. As a specific example of the deionization treatment, there can be exemplified an aqueous acid solution wash treatment, a hot water wash treatment, an organic solvent wash treatment and the like, and these treatments may be used in combination with 2 or more kinds of methods.

As a specific method for an organic solvent wash treatment of PPS resin, the following methods can be exemplified. Namely, as an organic solvent, it is not particularly limited as long as it has no function of decomposing a PPS resin, for example, there are listed nitrogen-containing polar solvents such as N-methylpyrrolidone, dimethylformamide and dimethylacetoamide; sulfoxide/sulfone based solvents such as dimethyl sulfoxide and dimethyl sulfone; ketone based solvents such as acetone, methyl ethyl ketone, diethyl ketone and acetophenone; ether based solvents such as dimethyl ether, dipropyl ether and tetrahydrofuran; halogen based solvents such as chloroform, methylene chloride, trichloroethylene, ethylene dichloride, dichloroethane, tetrachloroethane and chlorobenzene; alcohol/phenol based solvents such as methanol, ethanol, propanol, butanol, pentanol, ethylene glycol, propylene glycol, phenol, cresol and polyethylene glycol; aromatic hydrocarbon based solvents such as benzene, toluene and xylene. Among these organic solvents, N-methylpyrrolidone, acetone, dimethylformamide and chloroform are particularly preferably used. Further, these organic solvents may be used alone or in a mixture of 2 or more kinds.

As a method for washing with an organic solvent, there is a method that a PPS resin is immersed in an organic solvent, if necessary, suitable stirring or heating is also possible. The washing temperature in washing a PPS resin with an organic solvent is not particularly limited, and an arbitrary temperature can be selected in a range of ambient temperature to 300° C. As the washing temperature increases, washing efficiency tends to be higher, and a sufficient effect can be ordinarily obtained in a temperature from ambient temperature to 150° C. Further, it is preferable to wash a PPS resin conducted by an organic solvent wash by using water or warm water several times to remove the remaining organic solvent therein.

As a specific method for hot-water wash treatment of PPS resin, the following methods can be exemplified. Namely, to exhibit an effect of preferable chemical modifications of PPS resin by hot-water wash, water used is preferably distilled water or ion-exchanged water. The operation of hot water treatment is carried out ordinarily by pouring a predetermined amount of PPS resin into a predetermined amount of water, and heating and stirring at ambient pressure or in a pressure container. The ratio of PPS resin to water is preferably water-rich, ordinarily bath ratio is selected such that PPS is 200 g or less relative to one liter of water.

As a specific method for aqueous acid solution wash treatment of PPS resin, the following methods can be exemplified. Namely, there is a method that a PPS resin is immersed in an acid or aqueous acid solution, if necessary, suitable stirring or heating is also possible. The acid used is not particularly limited as long as it has no function of decomposing a PPS resin, there are listed aliphatic saturated monocarboxylic acids such as formic acid, acetic acid, propionic acid and butyric acid; halogen-substituted aliphatic saturated monocarboxylic acids such as chloroacetic acid and dichloroacetic acid; aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid and fumaric acid; and inorganic acidic compounds such as sulfuric acid, phosphoric acid, hydrochloric acid, carbonic acid and silicic acid. Among them, acetic acid and hydrochloric acid are preferably used. It is preferable to wash a PPS resin conducted by acid treatment by using water or warm water several times to remove the remaining acid or salt therein. Further, water used for washing is preferably distilled water or ion-exchanged water from the viewpoint not damaging an effect of preferable chemical modifications of PPS resin by acid treatment. When aqueous acid solution wash treatment is conducted, acid terminal components of PPS resin increase, in mixing with other thermoplastic resin, which is preferable because an enhancing effect of dispersion mixing performance is easily obtained.

In the polyarylene sulfide film of the present invention, it is preferable to comprise a thermoplastic resin (Y) because molding processability and acoustic properties in the present invention are improved, in particular, heat moldability is improved. As the thermoplastic resin (Y), for example, there can be used various kinds of polymers such as polyamide, polyetherimide, polyether sulfone, polysulfone, polyphenylene ether, polyester, polyarylate, polyamideimide, polycarbonate, polyolefin, and polyetheretherketone; and a blend containing at least one kind of these polymers. In the present invention, the thermoplastic resin (Y) is preferably polyamide, polyetherimide, polyether sulfone and polysulfone from the viewpoints of affinity for polyarylene sulfide and exhibition of the effect of the present invention.

Polyamide preferably used as the thermoplastic resin (Y) is not particularly limited as long as it is a known polyamide, it is generally a polyamide composed of amino acid, lactam or diamine and dicarboxylic acid as major constitutional components. As a typical example of the major constitutional component, there are listed amino acids such as 6-aminocaproic acid, 11-aminoundecanoic acid, 12-aminododecanoic acid and para-amiomethylbenzoic acid; lactams such as ∈-aminocaprolactam and ω-laurolactam; aliphatic, alicyclic and aromatic diamines such as tetramethylenediamine, hexamethylenediamine, undecamethylenediamine, dodecamethylenediamine, 2,2,4-/2,4,4-trimethylhexamethylenediamine, 5-methylnonamethylenediamine, meta-xylenediamine, para-xylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine and 2-methylpentamethylenediamine; and aliphatic, alicyclic and aromatic dicarboxylic acids such as adipic acid, speric acid, azelaic acid, sebacic acid, dodecanedioic acid, terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid, in the present invention, there can be used a polyamide homopolymer or copolymer derived from these raw materials each alone or in a mixture thereof.

In the present invention, as a useful polyamide, there are listed homopolyamide resins such as polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polydodecanamide (nylon 12), polyundecanamide (nylon 11), polyhexamethylene terephthalamide (nylon 6T) and polyxylene adipamide (nylon XD6), or copolymers of thereof, such as copolyamide resins (nylon 6/66, nylon 6/66/610, 66/6T) and the like. These polyamide resins can be used in mixture ("/" represents copolymerization, the same below).

Among the above-described resins, there are more preferably used nylon 6, nylon 610 as homopolyamide resins, and copolymer nylon 6/66 that nylon 6 is copolymerized with other polyamide component as copolyamides from the viewpoints of improving the elongation at break of polyarylene sulfide film and exhibiting the effect of the present invention, in particular, nylon 610 is preferably used because it has a high effect of enhancing the elongation at break of polyarylene sulfide film.

The preferable polyetherimide used in the present invention is not particularly limited as long as it is a polymer having an aliphatic, alicyclic or aromatic ether unit and a cyclic imide group as repeating units and having melt moldability. For example, there are polyetherimides described in U.S. Pat. Nos. 4,141,927, 2,622,678, 2,606,912, 2,606,914, 2,596,565, 2,596,566 and 2,598,478; and polymers described in U.S. Pat. Nos. 2,598,536 and 2,599,171, Japanese Unexamined Patent Publication No. 9-48852, U.S. Pat. Nos. 2,565,556, 2,564,636, 2,564,637, 2,563,548, 2,563,547, 2,558,341, 2,558,339 and 2,834,580. Within a range that the effect of the present invention is not damaged, in a main chain of polyetherimide, a structural unit other than cyclic imide and ether imide units, for example, aromatic, aliphatic and alicyclic ester units, an oxycarbonyl unit, etc. may be contained.

In the present invention, a condensate of 2,2-bis[4-(2,3-dicarboxyphenoxy)phenyl]propane dianhydride with m-phenylenediamine or p-phenylenediamine is preferable from the viewpoints of melt moldability. This polyetherimide is available from General Electric Corporation under a trade name "Ultem" (registered trademark).

Regarding the content of the thermoplastic resin (Y) contained in the polyarylene sulfide film of the present invention, it is preferable that the content of polyarylene sulfide is 60 to 99 parts by weight and the content of the thermoplastic resin (Y) is 1 to 40 parts by weight when the sum of contents of polyarylene sulfide and thermoplastic resin (Y) is 100 parts by weight, from the viewpoints of improving molding processability, acoustic properties and heat moldability. More preferably, the thermoplastic resin (Y) is 5 to 30 parts by weight based on that polyarylene sulfide is 70 to 95 parts by weight, further preferably, the thermoplastic resin (Y) is 7 to 20 parts by weight based on that polyarylene sulfide is 80 to 93 parts by weight, and most preferably, the thermoplastic resin (Y) is 10 to 15 parts by weight based on that polyarylene sulfide is 85 to 90 parts by weight for obtaining the effect of the present invention. When the thermoplastic resin (Y) is more than 40 parts by weight, excellent heat resistance, etc. of polyarylene sulfide is sometimes deteriorated. Further, when the thermoplastic resin (Y) is less than 1 part by weight, there is a case that the elongation at break of polyarylene sulfide film of the present invention cannot be sufficiently improved, breakage of film occurs in heat molding. Furthermore, there is a case that a demolding property from a mold after molding and a shape retention property are deteriorated.

In the present invention, to improve affinity of polyarylene sulfide and a thermoplastic resin (Y), addition of a compatible plasticizer is preferably adopted. As a specific example of the compatible plasticizer, an alkoxysilane having at least one kind of functional group selected from an epoxy group, an amino group and an isocyanate group is mentioned. As examples of such compound, there are listed epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane ureido group-containing alkoxysilane compounds such as γ-ureidopropyltriethoxysilane, γ-ureidopropylmethoxysilane and γ-(2-ureidoethyl)aminopropyltrimethoxysilane; isocyanate group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; and amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane. Among them, when an isocyanate group-containing alkoxysilane compound such as γ-isocyanatepropyltriethoxysilane, γ-isocyanatepropyltrimethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane and γ-isocyanatepropyltrichlorosilane is used, it is preferably used because it can improve affinity of polyarylene sulfide and a thermoplastic resin (Y). The added amount of the compatible plasticizer is 0.1 to 10 parts by weight relative to 100 parts by weight in total of polyarylene sulfide and thermoplastic resin (Y), more preferably 0.1 to 5 parts by weight, and further preferably 0.5 to 3 parts by weight.

When using an alkoxysilane having at least one kind of functional group selected from an epoxy group, an amino group and an isocyanate group, a siloxane bond tends to form between polyarylene sulfide and a thermoplastic resin A, and a siloxane bond tends to be present near an interface of dispersed phase. It is possible to detect a silicon atom near an interface of dispersed phase by using a TEM-EDX method. In the present invention, it is preferable that a silicon (Si) atom constituting a siloxane bond is contained in an interface of a dispersed phase composed of a thermoplastic resin A.

The polyarylene sulfide film of the present invention is excellent in molding processability, acoustic properties and heat moldability. To exhibit such characteristics, it is preferable that polyarylene sulfide constituting a polyarylene sulfide film forms a sea phase (continuous phase or matrix), and other thermoplastic resin (Y) forms an island phase (dispersed phase). Further, the average dispersion diameter of the thermoplastic resin (Y) constituting a dispersed phase is preferably 0.01 to 2 μm, more preferably 0.02 to 0.5 μm, further preferably 0.05 to 0.5 μm, and most preferably 0.05 to 0.3 μm. By which polyarylene sulfide forms a continuous phase, excellent characteristics of polyarylene sulfide such as heat resistance, chemical resistance and electric property can greatly reflect on the film. When this average dispersion diameter is set in the above-described range, it is preferable because a polyarylene sulfide film well balanced in molding processability, acoustic properties and heat moldability is easily obtained. When the average dispersion diameter of the dispersed phase is less that 0.01 μm, there is a case that the improvement of molding processability, acoustic properties and heat moldability cannot be sufficiently provided by enhancement of the elongation at break of the present invention. Further, when the average dispersion diameter is more than 2 μm, it is not preferable because there is a case that heat resistance is deteriorated and breakage of film occurs upon stretching in film-forming.

An average dispersion diameter of a dispersed phase herein means an average value of diameters in a longitudinal direction, width direction and thickness direction of the film. The average dispersion diameter can be measured using techniques such as transmission electron microscope and scanning electron microscope. For example, an average dispersion diameter can be calculated in such manner that a sample is prepared by an ultra-thin cutting method, the prepared sample is observed using a transmission electron microscope under the condition of applied voltage of 100 kv, and photographed by 10000 magnifications, the picture obtained is scanned in an image analyzer as an image, and an image treatment is conducted by selecting arbitrary 100 of dispersed phases.

The shape of a dispersed phase of the thermoplastic resin (Y) is preferably spherical, long and thin island, oval or fibrous. Aspect ratio of the dispersed phase is preferably in a range of 1 to 30. A further preferable range of aspect ratio of the dispersed phase is 2 to 20, and a more preferable range is 2 to 10. By setting the aspect ratio of the island component in the above-described range, it is easy to obtain a polyarylene sulfide film excellent in molding processability, improved acoustic properties and heat moldability, and it is preferable. Herein, aspect ratio means a ratio of average major axis/minor axis of a dispersed phase. The aspect ratio can be measured using techniques such as transmission electron microscope and scanning electron microscope. For example, the aspect ratio can be calculated in such manner that a sample is prepared by an ultra-thin cutting method, the prepared sample is observed using a transmission electron microscope under the condition of applied voltage of 100 kv, and photographed by 10000 magnifications, the picture obtained is scanned in an image analyzer as an image, and an image treatment is conducted by selecting arbitrary 100 of dispersed phases.

Additionally, the average dispersion diameter and aspect ratio of thermoplastic resin (Y) can be measured as follows, for example.

A sample is prepared by an ultra-thin cutting method by cutting in (i) a direction parallel to a longitudinal direction and perpendicular to film surface, (ii) a direction parallel to a width direction and perpendicular to film surface, and (iii) a direction parallel to film surface. To make a contrast of a dispersed phase clear, it may also be stained with phosphorus tungsten acid. The cut surface is observed using a transmission electron microscope (H-7100 FA model manufactured by Hitachi Corporation) under the condition of applied voltage of 100 kv, and photographed by 10000 magnifications, the picture obtained is scanned in an image analyzer as an image, and arbitrary 100 of dispersed phases are selected and, if necessary, an image treatment is conducted, thereby to be able to obtain a size of a dispersed phase as follows. There are observed the maximum length (1$a$) of the dispersed phase appeared in the cut surface of (i) in a film thickness direction and the maximum length (1$b$) in a longitudinal direction; the maximum length (1$c$) of the dispersed phase appeared in the cut surface of (ii) in a film thickness direction and the maximum length (1$d$) in a width direction; and the maximum length (1$e$) of the dispersed phase appeared in the cut surface of (iii) in a film thickness direction and the maximum length (1$f$) in a width direction. Next, when shape index of a dispersed phase I=(average of 1$b$+average of 1$e$)/2, shape index J=(average of 1$d$+average 1$f$)/2, and shape index K=(average of 1$a$+average 1$c$)/2 are set, an average dispersion diameter of the dispersed phase is defined as (I+J+K)/3. Further, from I, J and K, it is determined that the maximum value is an average major axis L and the minimum value is an average minor axis D, and aspect ratio of a dispersed phase is calculated from L/D.

In the present invention, timing of blending a mixture containing polyarylene sulfide and a thermoplastic resin (Y) constituting a polyarylene sulfide film is not particularly limited, there are a method that before melt extrusion, a mixture of polyarylene sulfide and a thermoplastic resin (Y) is previously melt-kneaded (pelletized) for getting a master chip, and a method that they are mixed and melt kneaded in melt extrusion. Among them, there is preferably exemplified a method that they are previously mixed and kneaded using a high shear kneader providing a shear stress such as a biaxial extruder for getting a master chip. In this case, melt film-forming may be done by charging the blended master chip raw material into an ordinary uniaxial extruder, or sheet-forming may be done directly in a state of being provided with a high shear without producing a master chip. In the case of mixing by a biaxial extruder, from the viewpoint of reducing a poorly dispersed material, an extruder equipped with a triple biaxial type or double biaxial type screw is preferable, in a kneading part, a temperature range is preferably a melting point of polyarylene sulfide resin+5 to 65° C. A further preferable temperature range is a melting point of polyarylene sulfide resin+ 10 to 45° C. By setting the temperature in a kneading part in the preferable range, shear stress is easily heightened and the effect of reducing a poorly dispersed material can be heightened. The residence time in this case is preferably in a range of 1 to 5 minutes. Further, the rotation number of a screw is preferably in a range of 100 to 500 rpm/min, further preferably in a range of 200 to 400 rpm/min. By setting the rotation number of a screw in the preferable range, a high shear stress is easily provided, and the dispersion diameter of a dispersed phase can be controlled in the preferable range of the present invention. Further, ratio (screw axis length/screw axis diameter) of a biaxial extruder is preferably in a range of 20 to 60, and further preferably in a range of 30 to 50. Furthermore, in a biaxial extruder, in order to heighten a kneading force in a biaxial extruder, it is preferable to provide a kneading part such as kneading paddle therein, a screw shape is constituted by, preferably, the kneading parts of two or more, further preferably three or more. In this case, the order of blending raw materials is not particularly limited, any method may be used, such as a method that all raw materials are compounded and then melt-kneaded by the above-described method, or a method that a part of raw materials are compounded and then melt-kneaded by the above-described method, further the other raw material are compounded and then melt-kneaded, or a method that a part of raw materials are compounded and then the other raw materials are mixed using a side feeder while melt kneading by a uniaxial extruder or biaxial extruder. Further, there can be preferably exemplified a method using a supercritical fluid described in journal of Japan Society Plastic Processing, "Processing" vol. 15 (6), p. 382-385 (2003).

In the polyarylene sulfide film of the present invention, in order to obtain heat moldability of the present invention, it is preferable that an inert particle is contained by 0.1 to 30 parts by weight relative to 100 parts by weight in total of polymers constituting the film. The heat moldability of the present invention means that a film can be processed without generating breakage of film in heat molding and after processing, demolding property from a mold is excellent and film form retention property of the film taken out is excellent. When the content of inert particle is less than 0.1 parts by weight relative to 100 parts by weight of the whole polymer, breakage of film hardly occurs in heat molding, but demolding property from a mold and film retention property are sometimes deteriorated. When the content of inert particle is more than 30 parts by weight relative to 100 parts by weight of the whole polymer, the elongation at break of film is sometimes lowered and breakage of film sometimes occurs in heat molding. The content of inert particle is more preferably 0.6 to 30 parts by weight, further preferably 1 to 20 parts by weight, and most preferably 5 to 20 parts by weight.

As the inert particle used in the present invention, there are listed inorganic particles such as calcium carbonate, silica, titanium oxide, alumina, kaolin, calcium phosphate, barium sulfate, talc and zinc oxide, and organic particles not melting till 300° C. such as crosslinked styrene based particle. Calcium carbonate and silica are preferable, and these particles are preferable because they are good in affinity to polymers and hardly generate void near particles in film-forming.

The particle diameter of an inert particle used in the present invention is preferably 0.1 μm or more and 3 μm or less, more preferably 0.5 to 1.5 μm. When the particle diameter is less than 0.1 μl, demolding property from a mold and film retention property after heat molding of the present invention are sometimes deteriorated. When more than 3 μm, the elongation at break of film is sometimes lowered, and breakage of film sometimes occurs in heat molding.

In the present invention, timing of blending polyarylene sulfide and an inert particle constituting a polyarylene sulfide film is not particularly limited, there is preferably used a method that before melt extrusion, a mixture of polyarylene sulfide and an inert particle is previously melt-kneaded (pelletized) for getting a master chip. Among them, there is preferably exemplified a method that they are previously kneaded using a high shear kneader providing a shear stress such as a biaxial extruder for getting a master chip. In the case of mixing by a biaxial extruder, from the viewpoint of reducing a poorly dispersed material, an extruder equipped with a triple biaxial type or double biaxial type screw is preferable. Further, the rotation number of a screw is preferably 100 to 500 rpm/min, further preferably in a rage of 200 to 400 rpm/min. By setting the rotation number of a screw in the preferable range, a high shear stress is easily provided, and dispersion of particle can be improved. Further, ratio (screw axis length/ screw axis diameter) of a biaxial extruder is preferably in a range of 20 to 60, and further preferably in a range of 30 to 50.

In the polyarylene sulfide film of the present invention, it is preferable that the Young's modulus thereof at 120° C. is 0.6 GPa or more and 2 GPa or less, more preferably 0.8 GPa or more and 2 GPa or less to improve heat moldability of the present invention. When the Young's modulus is less than 0.6 GPa, demolding property after heat molding is sometimes deteriorated, when the Young's modulus is more than 2 GPa, it is necessary to make a draw ratio in film-forming extremely high, the elongation at break of a film is sometimes lowered, and breakage of film sometimes generates in heat molding. Herein, Young's modulus of a film at 120° C. represents an average in a longitudinal direction and a width direction.

In the polyarylene sulfide film of the present invention, it is preferable that the elongation at break of a film at 120° C. is preferably 100% or more and 250% or less, more preferably 130% or more and 230% or less, and further preferably 150% or more and 200% or less. Herein, elongation at break of a film at 120° C. represents an average in a longitudinal direction and a width direction.

In order to set the Young's modulus and elongation at break of a film at 120° C. in the range of the present invention, this can be achieved in such manner that the thermoplastic resin and inert particle of the present invention are added by the present specific range, and the draw ratio in a longitudinal direction and a width direction upon production of the film of the present invention is set in a range of 2.4 to 4, preferably 2.6 to 3.6, and further preferable 2.6 to 3.4. Further, heat-set of this stretched film under extension or relaxing in a width direction tends to obtain the effect of the present invention.

The density of the polyarylene sulfide film of the present invention is, from the viewpoint of improving acoustic properties, preferably 1.3 g/cm$^3$ or more and 1.4 g/cm$^3$ or less, more preferably 1.32 g/cm$^3$ or more and 1.39 g/cm$^3$ or less, and further preferably 1.33 g/cm$^3$ or more and 1.38 g/cm$^3$ or less. When the density is less than 1.3 g/cm$^3$, it is not preferable because an effect of improving acoustic properties is hardly obtained sometimes. On the other hand, when the density is more than 1.4 g/cm$^3$, it is not preferable because breakage of film often occurs in film-forming. In order to set the density of a film in the preferable range of the present invention, the heat-set temperature after biaxial stretching is set in a range of 200 to 275° C., preferably 220 to 270° C., and further preferably 240 to 265° C. Further, the heat-set time is preferably set in a range of 0.2 to 30 seconds.

In the polyarylene sulfide film for an acoustic instrument vibrating plate of the present invention, the thickness of film is preferably 3 μm or more and 100 μm or less, more preferably 10 μm or more and 100 μm or less, further preferably 15 μm or more and 75 μm or less, and most preferably 20 μm or more and 60 μm or less. When the thickness of film is less than 3 μm, it is not preferable because the film easily deforms in handling, handling the film becomes difficult. On the other hand, when the thickness of film exceeds 100 μm, it is not preferable because low-pass reproduction becomes insufficient, there tends to arise a problem that peak-dip on acoustic frequency characteristics easily occurs and so on.

In the polyarylene sulfide film of the present invention, within a range that the effect of the present invention is not damaged, other components may be added such as a heat stabilizer, antioxidant, ultraviolet absorber, antistatic agent, flame retardant, pigment, dye, and organic lubricant including fatty acid ester and wax. Further, in order to provide a film surface with easy lubrication, abrasion resistance, scratch resistance and the like, inorganic and organic particles can be also added in a polyarylene sulfide film. As the additives, for example, there are listed inorganic particles such as clay, mica, titanium oxide, calcium carbonate, kaolin, talc, wet or dry silica, colloidal silica, calcium phosphate, barium sulfate, alumina and zirconia; and organic particles having constitutional components such as acrylic acids and styrene; so-called internal particles precipitated by catalysts, etc. being added in polymerization reaction of polyphenylene sulfide; and surfactants.

Further, if necessary, the polyarylene sulfide film of the present invention may be subjected to an arbitrary processing such as heat treatment, forming, surface treatment, lamination, coating, printing, emboss treatment and etching.

The polyarylene sulfide film of the present invention is preferably for heat molding. The heat-forming temperature is preferably the glass transition temperature of polyphenylene sulfide or higher, more preferably the glass transition temperature of polyphenylene sulfide+50° C. or more, and further preferably the glass transition temperature of polyphenylene sulfide+100° C. or more. By heat molding in the range, breakage of film can be suppressed in molding.

Further, whereas a glass transition temperature (Tg) of the polyarylene sulfide film of the present invention is observed at 85° C. or more and less than 95° C., it is preferably not observed at 95° C. or more to 130° C. or less. When Tg is less than 85° C., heat resistance of film sometimes becomes low, and when Tg is observed at 95° C. or more to 130° C. or less, breakage of film sometimes occurs in heat molding.

Next, methods for forming the polyarylene sulfide film of the present invention will be described with reference to a production of biaxially oriented polyphenylene sulfide film constituted by a mixed phase containing poly(p-phenylene) sulfide as polyarylene sulfide and polyamide as a thermoplastic resin (Y). Apparently, the present invention is not limited to the following descriptions.

In the case where polyphenylene sulfide and nylon 610 are mixed, there is preferably exemplified a method that a mixture of respective resins is previously melt-kneaded (pelletized) for getting a master chip before melt extrusion.

In the present invention, first, the above-described PPS and nylon 610 are charged in a biaxial kneading extruder, it is preferable to produce blend raw materials having a weight ratio of PPS and nylon 610 of 99/1 to 60/40. The method for mixing/kneading a resin composition of blend raw materials is not particularly limited, various mixing/kneading means are used. For example, each may be separately fed to a melt extruder and mixed, or only powder raw materials may be previously dry-blended by utilizing a mixing machine such as Henschel mixer, ball mixer, blender and tumbler, thereafter, melt-kneaded by a melt kneader. It is preferable from the viewpoints of film quality and film-forming performance that thereafter, if necessary, the above-described blend raw materials is charged to an extruder together with PPS and recovered raw materials thereof to produce a target composition as a raw material. In the case of producing the above-described raw material, in order to prevent foreign materials mixing in a film to the utmost extent, filtration of resins can be preferably conducted in a melt extrusion step. In order to remove foreign materials and degrade polymers in this extruder, it is preferable to use various filters, for examples, filters made of sintered metal, porous ceramic, sand and metal net. Further, if necessary, a gear pump may be equipped to improve quantitative feed performance.

More specific conditions of a method for producing the above-described preferable polyphenylene sulfide film are as follows.

First, pellets or granules of polyphenylene sulfide and pellets of nylon 610 are mixed in a constant ratio, fed to a vent type biaxial kneading extruder and melt-kneaded to give a blend chip. It is preferable to use a high-shear mixer providing shear stress such as a biaxial extruder, further, from the viewpoints of reducing a poorly dispersed material, one equipped with a triple biaxial type or double biaxial type screw is preferable and the residence time in this case is preferably 1 to 5 minutes. Further, a resin temperature in a kneading part is preferably in a range of the melting point of polyarylene sulfide resin+5 to 65° C., a more preferable temperature range is the melting point of polyarylene sulfide resin+10 to 45° C. By setting the resin temperature in a kneading part in the preferable range, shear stress is easily heightened, an effect of reducing a poorly dispersed material becomes high, and dispersion diameter of a dispersed phase can be controlled in the preferable range of the present invention. Further, the rotation number of a screw is preferably 100 to 500 rpm/min, further preferably in a rage of 200 to 400 rpm/min. By setting the rotation number of a screw in the preferable range, a high shear stress is easily provided, and the dispersion diameter of a dispersed phase can be controlled in the preferable range of the present invention. Further, ratio (screw axis length/screw axis diameter) of a biaxial extruder is preferably in a range of 20 to 60, and further preferably in a range of 30 to 50. Furthermore, in order to heighten a kneading force in a biaxial extruder, it is preferable to provide a kneading part such as kneading paddle therein, it is further preferable that a screw shape is constituted by providing two or more of the kneading parts to be an ordinary feed screw between respective kneading parts.

In blending polyphenylene sulfide and nylon 610, when a blend composition of polyphenylene sulfide and nylon 610 or a compatible plasticizer is added, a poorly dispersed material can be sometimes reduced and compatibility is sometimes heightened.

Thereafter, a blend chip composed of PPS and nylon 610 obtained by the above-described pelletizing operation, and optionally a raw material that PPS and a recovered raw material or particle after film-forming are blended are suitably mixed in a constant ratio, dried at 180° C. under reduced pressure for 3 hours or more, and then charged in an extruder heated at a temperature of 300 to 350° C., preferably 320 to 340° C. Thereafter, a melt polymer via the extruder is passed through a filter, and the melt polymer is then extruded into a sheet form using a T-die. This sheet-like material is closely contacted on a cooling drum at its surface temperature of 20 to 70° C., cooled and solidified, thereby to give an unstretched polyphenylene sulfide film in a substantially unoriented state.

Next, this unoriented polyphenylene sulfide film is biaxially stretched to give a biaxial orientation. As a stretching method, there can be used a sequential biaxial stretching method (stretching method in combination of stretching in each direction such as a method of stretching in a width direction after stretching in a longitudinal direction), a simultaneous biaxial stretching method (method of simultaneously stretching in longitudinal and width directions) or a method in combination thereof.

Herein, there is used a sequential biaxial stretching method that stretching is first done in a longitudinal direction and next in a width direction. The stretching temperature varies depending on constitutional components of PPS and polyamide constituting a film, for example, it will be explained below by an example of a resin composition composed of 90 parts by weight of PPS and 10 parts by weight of nylon 610.

Unoriented polyphenylene sulfide film is heated by a group of heat rolls, the draw ratio is 2.2 to 5 in a longitudinal direction (MD direction), preferably 2.4 to 4.5, and further preferably 2.6 to 4, being stretched in one step or multi-step more than one step (MD stretching) from the viewpoints of setting the elongation at break and Young's modulus in the preferable range of the present invention. The stretching temperature is in a range of Tg (glass transition temperature of PPS) to (Tg+50)° C., preferably (Tg+5) to (Tg+50)° C., and further preferably (Tg+5) to (Tg+40)° C. Thereafter, it is cooled by a group of cooling rolls at 20 to 50° C.

As a stretching method in a width direction (TD direction) following by MD stretching, for example, a method using a tenter is common. This film is introduced to a tenter while holding both the ends by clips, and stretched in a width direction (TD stretching). The stretching temperature is preferably from Tg to (Tg+60)° C., more preferably (Tg+5) to (Tg+50)° C., and further preferably (Tg+10) to (Tg+40)° C. From the viewpoints of setting the elongation at break and Young's modulus in the preferable range of the present invention, the draw ratio is 2.2 to 5, preferably 2.4 to 4.5, and further preferably 2.6 to 4.

Next, this stretched film is heat-set under extension or relaxing in a width direction. A preferable heat-set temperature is in a range of 200 to 275° C., more preferably 220 to 270° C., and further preferably 240 to 265° C. The heat-set time is preferably set in a range of 0.2 to 30 seconds. Further, this film is cooled in a temperature zone of 40 to 180° C. while relaxing in a width direction. The relaxing rate is, from the viewpoint of improving the elongation at break, preferably in a range of 1 to 10%, more preferably 2 to 9%, and further preferably 3 to 8%.

Further, the film is, if necessary, while conducting a relaxing treatment in longitudinal and width directions, cooled to room temperature and wound up to give a target biaxially oriented polyphenylene sulfide film.

Next, a method for producing the polyarylene sulfide film of the present invention will be described, using calcium carbonate of 1.2 μm particle diameter as an inert particle, by an example of production of a biaxially oriented polyphenylene sulfide film constituted by a mixed layer containing poly-p-phenylene sulfide (sometimes abbreviated as PPS) as polyarylene sulfide and polyetherimide as a thermoplastic resin (Y). Apparently, the present invention is not limited to the following descriptions.

In the case of blending polyphenylene sulfide, calcium carbonate and polyetherimide, there is preferably exemplified a method that, before melt extrusion, a mixture of respective resins is previously melt-kneaded beforehand (pelletized) for getting a master chip.

In the present invention, first, a master raw material of PPS and calcium carbonate is produced. PPS and calcium carbonate are charged in a biaxial kneading extruder, and a master raw material having a weight ratio of 95/5 to 70/30 is produced. Mixing/kneading method is not particularly limited, various mixing/kneading means are used. For example, it may be mixed using a mixing machine such as Henschel mixer, ball mixer, blender and tumbler, thereafter, melt-kneaded by a melt kneader.

Next, a blend raw material of PPS and polyetherimide is produced. PPS and polyetherimide are charged in a biaxial kneading extruder, it is preferable to produce a blend raw material for a weight ratio of PPS and polyetherimide to be 99/1 to 50/50. Mixing/kneading method of a resin composition of blend raw materials is not particularly limited, various mixing/kneading means are used. For example, each may be separately fed to a melt extruder and mixed, or only powder raw materials may be previously dry-blended by utilizing a mixing machine such as Henschel mixer, ball mixer, blender and tumbler, thereafter, melt-kneaded by a melt kneader.

In kneading PPS and calcium carbonate, or PPS and polyetherimide, each is fed to a vent type biaxial kneading extruder and melt-kneaded to give a blend chip. It is preferable to use a high-shear mixer providing shear stress such as a biaxial extruder, further, from the viewpoints of reducing a poorly dispersed material, one equipped with a triple biaxial type or double biaxial type screw is preferable and the residence time is in this case preferably 1 to 5 minutes. Further, a resin temperature in a kneading part is preferably in a range of the melting point of polyarylene sulfide resin+5 to 65° C. A further preferable temperature range is the melting point of polyarylene sulfide resin+10 to 45° C. By setting the resin temperature in a kneading part in the preferable range, shear stress is easily heightened, an effect of reducing a poorly dispersed material becomes high, and dispersion diameter of a dispersed phase can be controlled in the preferable range of the present invention. Further, the rotation number of a screw is preferably 100 to 500 rpm/min, further preferably in a rage of 200 to 400 rpm/min. Further, ratio (screw axis length/screw axis diameter) of a biaxial extruder is preferably in a range of 20 to 60, and further preferably in a range of 30 to 50. Furthermore, in order to heighten a kneading force in a biaxial extruder, it is preferable to provide a kneading part such as kneading paddle therein, it is further preferable that a screw shape is constituted by providing two or more of the kneading parts to be an ordinary feed screw between respective kneading parts.

In blending PPS and polyetherimide, when a compatible plasticizer is added, a poorly dispersed material can be sometimes reduced and compatibility is sometimes heightened.

Next, a raw material that a master raw material of PPS and calcium carbonate, a blend raw material composed of PPS and polyetherimide obtained by the above-described pelletizing operation, and optionally PPS and a recovered raw material or particle after film-forming are blended is suitably mixed in a constant ratio, dried at 180° C. under reduced pressure for 3 hours or more, and then charged in an extruder heated at a temperature of 300 to 350° C., preferably 320 to 340° C. Thereafter, a melt polymer via the extruder is passed through a filter, and the melt polymer is then extruded into a sheet form using a T-die. This sheet-like material is closely contacted on a cooling drum at its surface temperature of 20 to 70° C., cooled and solidified, thereby to give an unstretched polyphenylene sulfide film in a substantially unoriented state.

Next, this unoriented polyphenylene sulfide is biaxially stretched to give a biaxial orientation. As a stretching method, there can be used a sequential biaxial stretching method (stretching method in combination of stretching in each direction such as a method of stretching in a width direction after stretching in a longitudinal direction), a simultaneous biaxial stretching method (method of simultaneously stretching in longitudinal and width directions) or a method in combination thereof. Herein, there is used a sequential biaxial stretching method that stretching is first done in a longitudinal direction and next in a width direction. The stretching temperature varies depending on constitutional components of PPS and polyetherimide constituting a film, for example, it will be explained below by an example of a resin composition composed of 80% by weight of PPS, 10% by weight of calcium carbonate and 10% by weight of polyetherimide.

Unoriented polyphenylene sulfide film is heated by a group of heat rolls, and stretched in a longitudinal direction (MD direction) with a draw ratio of 2.4 to 4, preferably 2.6 to 3.6, and further preferably 2.6 to 3.4 by one step or multi-step more than one step (MD stretching). The stretching temperature is in a range of Tg (glass transition temperature of PPS) to (Tg+50)° C., preferably (Tg+5) to (Tg+50)° C., and further preferably (Tg+5) to (Tg+40)° C. Thereafter, it is cooled by a group of cooling rolls at 20 to 50° C.

As a stretching method in a width direction (TD direction) following MD stretching, for example, a method using a tenter is common. This film is introduced to a tenter while holding both the ends by clips, stretched in a width direction (TD stretching). The stretching temperature is preferably from Tg to (Tg+60)° C., more preferably (Tg+5) to (Tg+50)° C., and further preferably (Tg+10) to (Tg+40)° C. The draw ratio is 2.4 to 4, more preferably 2.6 to 3.6, and further preferably 2.6 to 3.4.

Next, this stretched film is heat-set under extension or relaxing in a width direction. A preferable heat-set temperature is in a range of 200 to 275° C., more preferably 220 to 270° C., and further preferably 240 to 265° C. The heat-set time is preferably set to a range of 0.2 to 30 seconds. Further, this film is cooled in a temperature zone of 40 to 180° C. while relaxing in a width direction. The relaxing rate is, from the viewpoint of improving the elongation at break, preferably in a range of 1 to 10%, more preferably 1 to 8%, and further preferably 1 to 5%.

Further, the film is, if necessary, while conducting a relaxing treatment in longitudinal and width directions, cooled to room temperature and wound up to give a target biaxially oriented polyphenylene sulfide film.

[Measuring Method of Physical Property and Evaluation Method of Effect]

(1) Elongation at Break, Young's Modulus (Room Temperature)

A film was cut in the longitudinal and width directions to a strip-like sample of 200 mm in length and 10 mm in width and used. Elongation at break and Young's modulus were measured in accordance with JIS K7127 and JIS Z1702, respectively using a tensile tester of Instron type. The measurement was conducted in the following conditions, 10 samples were measured each in MD direction and TD direction and the average was obtained. Measuring apparatus: "Tensilon AMF/RTA-100", automatic film stress-strain tester manufactured by Orientec Corporation Sample size: 10 mm in width×100 mm in length of sample
Tensile speed: 100 mm/min
Measuring environment: temperature 23° C., humidity 65% RH (2) Elongation at Break, Young's Modulus (120° C.)

A film was cut in the longitudinal and width directions to a strip-like sample of 200 mm in length and 10 mm in width and used. Elongation at break and Young's modulus were measured in accordance with JIS K7127 and JIS Z1702, respectively using a tensile tester of Instron type. The measurement was conducted in the following conditions, 10 samples were measured each in MD direction and TD direction and the average was obtained. Measuring apparatus: "Tensilon AMF/RTA-100", automatic film stress-strain tester manufactured by Orientec Corporation Sample size: 10 mm in width×100 mm in length of sample
Tensile speed: 100 mm/min
Measuring environment: temperature 120° C.

(3) Film Thickness

Film thickness was measured at 23° C., 65% RH by a needle pressure of 30 g using an electric micrometer (K-312A model) manufactured by Anritsu Corporation.

(4) Detection of Silicon Atom in Interface of Dispersion Diameter

A film was cut parallel to a longitudinal direction and perpendicular to film surface, and a sample was prepared by an ultra-thin cutting method. In order to make a contrast of a dispersed phase clear, it may be stained with osmic acid, ruthenium acid or phosphorus tungsten acid. When a thermoplastic resin A is polyamide, phosphorus tungsten acid is preferably used for dyeing. The cut surface was measured using a field emission type electron microscope (JEM2100F manufactured by JEOL Corp., EDX (JED-2300T manufactured by JEOL Corp.)) in the conditions: applied voltage of 200 kv, sample absorption current of $10^{-9}$ A, EDX-ray analysis 20 sec/point and beam diameter of 1 nm by a TEM-EDX method, to evaluate an interface of a dispersed phase. Ten arbitrary dispersed phases were evaluated, one which was detectable was ○ and one which was not detectable was x.

(5) Molding Processability 1

Figure 2:
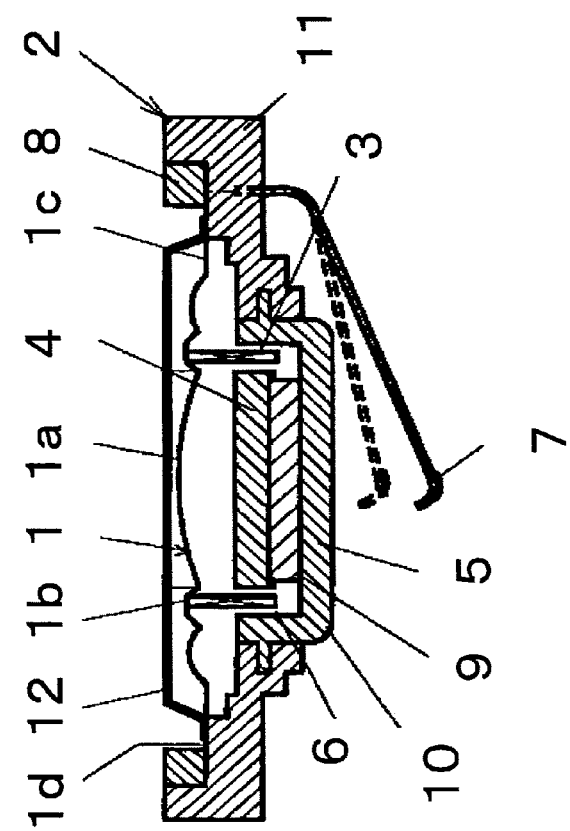
FIG. 2 is a cross sectional view of a speaker using an acoustic instrument vibrating plate of the present invention.

A film is heated in an temperature atmosphere of 150° C., pressed at a pressure of 0.4 MPa for 15 seconds in a mold which is heated at about 230° C. and has a deep drawing part capable of bending a film at 180°, cooled to 150° C., and then taken out at room temperature to produce an acoustic instrument vibrating plate (FIG. 1) used in a speaker with a constitution shown in FIG. 2. A diameter of coil is set to 10 mm. In this case, 100 pieces of speakers were produced, processability was evaluated in the following criteria. ◎, ○ are accepted.
◎: No problem at all, film can be formed in a desired shape.
○: 1 to 3 pieces, wrinkle occurs due to heat shrinkage strain.
Δ: 4 to 7 pieces, wrinkle occurs due to heat shrinkage strain.
x: 8 pieces or more, wrinkle occurs due to heat shrinkage strain, film is torn in processing and vibrating plate with a desired shape can not obtained.

(6) Heat Resistance

A vibrating plate formed in a desired shape is left in an atmosphere at 100° C. Thereafter, the vibrating plate is taken out at room temperature to observe degree of heat deformation. The heat resistance was evaluated by the following criteria. ◎, ○ are accepted.
◎: No heat deformation at all, shape after forming is maintained as it is.
○: Some heat deformation, but shape after forming is almost maintained.
x: Vibrating plate is strained as whole with deep-drawing part and folding part being stretched and deformed.

(7) Acoustic Property

Evaluation was done by measuring frequency property in accordance with JIS C 5532, when there is no fluttering sound, and high sound pressure in low tone range with being very excellent as speaker is shown as ◎. Good as speaker is shown as ○, and when fluttering sound generates, poor performance is shown as x. ◎, ○ are accepted.

(8) Molding Processability 2, Demolding Property after Molding, and Shape Retention Property A film is pressed at a pressure of 0.4 MPa for 15 seconds in a mold which is heated at 180° C. or 230° C. and has a deep drawing part capable of bending a film at 180°, cooled to 100° C. or 120° C., and then taken out at room temperature to evaluate heat moldability, demolding property after molding and shape retention property by the following criteria.
(Molding Processability)
○: Film can be molded without breakage of film.
x: Film is torn in molding, vibrating plate with a desired shape is not obtained.
(Demolding Property and Shape Retention Property)
○: Film can be taken out from a mold, desired shape after being taken out is maintained.
x: Film is hardly taken out from a mold, shape after being taken out is deformed.

EXAMPLES

Reference Example 1

Polymerization of poly-p-phenylene sulfide (PPS)

In an autoclave of 70 liters equipped with a stirrer, discharged were 8,267.37 g of 47.5 wt % sodium hydrosulfide (70.00 mol), 2,957.21 g of 96 wt % sodium hydroxide (70.97 mol), 11,434.50 g of N-methyl-2-pyrrolidone (NMP) (115.50 mol), 2,583.00 g of sodium acetate (31.50 mol) and 10, 500 g of ion-exchanged water, slowly heated to 245° C. over about 3 hours at normal pressure while passing nitrogen, after 14, 780.1 g of water and 280 g of NMP were distilled away, the reaction container was cooled to 160° C. The remaining water content inside the system per 1 mol of alkali metal sulfide charged was 1.06 moles together with water consumed by hydrolysis of NMP. Further, the amount of hydrogen sulfide flied out was 0.02 moles per 1 mol of alkali metal sulfide charged.

Next, 10,235.46 g of p-dichlorobenzene (69.63 mol) and 9,009.00 g of NMP (91.00 mol) were added, the reaction container was sealed under nitrogen gas, while stirring at 240 rpm, raised to 238° C. at a speed of 0.6° C./min. After conducting reaction at 238° C. for 95 minutes, the temperature was raised to 270° C. at a speed of 0.8° C./min. After conducting reaction at 270° C. for 100 minutes, while injecting 1,260 g (70 mol) of water therein over 15 minutes, cooled to 250° C. at a speed of 1.3° C./min. Thereafter, it was cooled to 200° C. at a speed of 1.0° C./min, then rapidly cooled near room temperature.

The content was taken out, diluted with 26,300 g of NMP, then the solvent and solid content were filtered by a sieve (80 mesh), and the resulting particle was washed with 31,900 g of NMP and collected by filtration. This was washed several times with 56,000 g of ion-exchanged water and collected by filtration, then washed with 70,000 g of 0.05 wt % acetic acid aqueous solution and collected by filtration. After washing with 70,000 g of ion-exchanged water and collecting by filtration, the resulting PPS particle was dried by hot air at 80° C., and dried under reduced pressure at 120° C. The thus obtained PPS had a melt viscosity of 200 Pa·s (310° C., shear velocity 1,000/s), the glass transition temperature was 90° C., and the melting point was 285° C.

Reference Example 2

Production of nylon 6/66 copolymer (polyamide-3 (PA-3))

50 wt % aqueous solution of salt (AH salt) of adipic acid with hexamethylenediamine, and ∈-caprolactam (CL) were mixed so that AH salt was 20 parts by weight and CL was 80 parts by weight, and the mixture was charged in an autoclave of 30 liters. After it was raised to 270° C. at an internal pressure of 10 kg/cm², the internal temperature was maintained at 245° C., while stirring, the pressure was slowly reduced to 0.5 kg/cm² and stirring was stopped. After being returned to normal pressure by nitrogen, a strand was drawn out, pelletized, and unreacted substances were extracted out using boiling water, and dried. The thus obtained copolyamide 6/66 resin had a relative viscosity of 4.20 and melting point of 193° C.

Reference Example 3

Production of polyethylene-2,6-naphthalate (PEN) polymer chip

To a mixture of 100 parts by weight of dimethyl 2,6-naphthalate and 60 parts by weight of ethylene glycol, 0.03 parts by weight of manganese acetate tetrahydrate was added, and ester exchange reaction was conducted while the temperature was slowly raised from 150° C. to 240° C. Along the way, when the reaction temperature reached at 170° C., 0.024 parts by weight of antimony trioxide was added thereto. Further, when the reaction temperature reached at 220° C., 0.042 parts by weight of tetrabutyl 3,5-dicarboxybenzenesulfonate phosphonium salt (corresponding to 2 mmol %) was added thereto. Thereafter, the ester exchange reaction was continuously conducted, after completion of ester exchange reaction, 0.023 parts by weight of trimethyl phosphate was added thereto. Next, the reaction product was transferred to a polymerization reactor, the temperature was raised to 290° C., polycondensation reaction was conducted under a highly reduced pressure of 0.2 mmHg or less, thereby to give a polyethylene-2,6-naphthalate chip having an inherent viscosity of 0.65 dl/g.

Example 1

A raw material that 0.3 wt % of calcium carbonate powder having an average particle diameter of 1.2 μm and 0.05 wt % of calcium stearate were added to 100 parts by weight of the PPS resin produced in Reference example 1 and uniformly dispersed/compounded raw material was dried at 150° C. under reduced pressure for 3 hours, and then fed to a uniaxial extruder of full-flight that the melt part was heated at 320° C. Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film.

This unstretched polyphenylene sulfide film was stretched at 107° C. by 3.3 times in a longitudinal direction of film by using a longitudinal stretch machine constituted by a plurality of rolls heated and by utilizing circumferential velocity difference between rolls. Thereafter, this film was introduced to a tenter while holding both ends by clips, stretched at a draw temperature of 107° C. by a draw ratio of 3.3 in a width direction of film, followed by heat treatment at a temperature of 265° C. for 4 seconds, then subjected to a 5% relaxing treatment in a lateral direction in a cool zone controlled at 150° C., cooled to room temperature, and the film edges were removed, thereby to produce a biaxially oriented polyphenylene sulfide film of 30 μm in thickness.

The measurement and evaluation results on the constitution and characteristic of the biaxially oriented polyphenylene sulfide film obtained are shown in Table 1, and this biaxially oriented polyphenylene sulfide film was excellent in molding processability, heat resistance and acoustic properties.

Example 2

A biaxially oriented polyphenylene sulfide film was obtained in the same manner as in Example 1 except that the draw ratio in the film-forming condition of biaxially oriented polyphenylene sulfide film was changed as shown in Table 1. The biaxially oriented polyphenylene sulfide film obtained in the present Example was excellent in molding processability, heat resistance and acoustic properties.

Example 3

PPS resin produced in Reference example 1 of 90 parts by weight was dried at 180° C. under reduced pressure for 3 hours, as a thermoplastic resin (Y), nylon 610 resin (nylon resin, "Amilan CM2001" manufactured by Toray Industries Inc., polyamide-1 (PA-1)) of 10 parts by weight was dried at 120° C. under reduced pressure for 3 hours, further, as a compatible plasticizer, γ-isocyanatepropyltriethoxysilane ("KBE9007" manufactured by Shin-Etsu Chemical Co., Ltd.) of 0.5 parts by weight was compounded to 100 parts by weight in total of the PPS resin and nylon 610, then charged in a co-rotational biaxial kneading extruder having a vent provided with three kneading paddle mixing parts being heated at 330° C. (manufactured by Japan Steel Works Ltd., screw diameter 30 mm, screw length/screw diameter=45.5), and melt extruded in a strand form by residence time of 90 seconds and screw rotation number of 300 rpm/min, cooled in water at 25° C., then immediately cut to produce a blend chip. A raw material that 0.3 wt % of calcium carbonate powder having an average particle diameter of 1.2 μm and 0.05 wt % of calcium stearate were added to 100 parts by weight of the blend chip of PPS/PA-1 (90/10 wt %) and uniformly dispersed/compounded raw material was dried at 150° C. under reduced pressure for 3 hours, and then fed to a uniaxial extruder of full-flight that the melt part was heated at 320° C.

Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film.

This unstretched polyphenylene sulfide film was stretched at 110° C. by 2.8 times in a longitudinal direction of film by using a longitudinal stretch machine constituted by a plurality of rolls heated and by utilizing circumferential velocity difference between rolls. Thereafter, this film was introduced to a tenter while holding both ends by clips, stretched at a draw temperature of 110° C. by a draw ratio of 2.8 in a width direction of film, followed by heat treatment at a temperature of 265° C. for 4 seconds, then subjected to a 5% relaxing treatment in a lateral direction in a cool zone controlled at 150° C., cooled to room temperature, and the film edges were removed, thereby to produce a biaxially oriented polyphenylene sulfide film of 30 μm in thickness.

The measurement and evaluation results on the constitution and characteristic of the biaxially oriented polyphenylene sulfide film obtained are shown in Table 1, and this biaxially oriented polyphenylene sulfide film was excellent in molding processability, heat resistance and acoustic properties.

Examples 4, 5, 6

A biaxially oriented polyphenylene sulfide film was obtained in the same manner as in Example 3 except that the added amount of PA-1 as a thermoplastic resin (Y) was changed as shown in Table 1. The measurement and evaluation results on the constitution and characteristic of the biaxially oriented polyphenylene sulfide film obtained were shown in Table 1. The biaxially oriented polyphenylene sulfide film obtained in Example 4 was excellent in molding processability, heat resistance and acoustic properties. The biaxially oriented polyphenylene sulfide film obtained in Example 5 was somewhat inferior in heat resistance, but was a level usable in practice, was excellent in processability and acoustic properties. The biaxially oriented polyphenylene sulfide film obtained in Example 6 was somewhat inferior in molding processability, but was a level usable in practice, was excellent in heat resistance and acoustic properties.

Example 7

A biaxially oriented polyphenylene sulfide film was obtained in the same manner as in Example 3 except that as a thermoplastic resin (Y), nylon 6 (CM1001 manufactured by Toray Industries Inc., polyamide-2 (PA-2)) was used. The measurement and evaluation results on the constitution and characteristic of the biaxially oriented polyphenylene sulfide film obtained are shown in Table 1, and the biaxially oriented polyphenylene sulfide film obtained in the present Example was excellent in molding processability, heat resistance and acoustic properties.

Example 8

A biaxially oriented polyphenylene sulfide film was obtained in the same manner as in Example 3 except that as a thermoplastic resin (Y), nylon 6/66 copolymer (polyamide-3 (PA-3)) prepared in Reference example 2 was used. The measurement and evaluation results on the constitution and characteristic of the biaxially oriented polyphenylene sulfide film obtained are shown in Table 1, and the biaxially oriented polyphenylene sulfide film obtained in the present Example was excellent in molding processability, heat resistance and acoustic properties.

Example 9

A biaxially oriented polyphenylene sulfide film was obtained in the same manner as in Example 3 except that as a thermoplastic resin (Y), polyetherimide ("Ultem 1010" manufactured by GE Plastics Corporation) (PEI) was used. The measurement and evaluation results on the constitution and characteristic of the biaxially oriented polyphenylene sulfide film obtained are shown in Table 1, and the biaxially oriented polyphenylene sulfide film obtained in the present Example was excellent in molding processability, heat resistance and acoustic properties.

Examples 10, 11

A biaxially oriented polyphenylene sulfide film was obtained in the same manner as in Example 3 except that the added amount of PEI as a thermoplastic resin (Y) was changed as shown in Table 1. The measurement and evaluation results on the constitution and characteristic of the biaxially oriented polyphenylene sulfide film obtained were shown in Table 1. The biaxially oriented polyphenylene sulfide film obtained in Example 10 was excellent in molding processability, heat resistance and acoustic properties. The biaxially oriented polyphenylene sulfide film obtained in Example 11 was somewhat inferior in molding processability, heat resistance and acoustic properties, but was a level usable in practice.

Example 12

A biaxially oriented polyphenylene sulfide film was obtained in the same manner as in Example 9 except that the draw ratio in the film-forming condition of biaxially oriented polyphenylene sulfide film obtained in Example 9 was changed as shown in Table 1. The biaxially oriented polyphenylene sulfide film obtained was somewhat inferior in molding processability, but was excellent in heat resistance and acoustic properties.

Example 13

A biaxially oriented polyphenylene sulfide film was obtained in the same manner as in Example 9 except that as a compatible plasticizer, bisphenol A type epoxy resin ("Epicoat" 1004 manufactured by Yuka-Shell Epoxy Co., Ltd.) of 2 parts by weight was compounded in Example 9. The measurement and evaluation results on the constitution and characteristic of the biaxially oriented polyphenylene sulfide film obtained were shown in Table 1. The biaxially oriented polyphenylene sulfide film obtained was deteriorated in molding processability

Example 14

A biaxially oriented polyphenylene sulfide film was obtained in the same manner as in Example 3 except that as a thermoplastic resin (Y), polyether sulfone ("RADEL" manufactured by Amoco Corporation) (PES) was used. The measurement and evaluation results on the constitution and characteristic of the biaxially oriented polyphenylene sulfide film obtained are shown in Table 1, and the biaxially oriented polyphenylene sulfide film obtained in the present Example was excellent in molding processability, heat resistance and acoustic properties.

Example 15

A biaxially oriented polyphenylene sulfide film was obtained in the same manner as in Example 3 except that as a thermoplastic resin (Y), polysulfone ("UDEL" manufactured by Amoco Corporation) (PSF) was used. The measurement and evaluation results on the constitution and characteristic of the biaxially oriented polyphenylene sulfide film obtained are shown in Table 1, and the biaxially oriented polyphenylene sulfide film obtained in the present Example was excellent in molding processability, heat resistance and acoustic properties.

Example 16

PPS resin produced in Reference example 1 of 90 parts by weight was dried at 180° C. under reduced pressure for 3 hours, as a thermoplastic resin (Y), nylon 610 resin (nylon resin, "Amilan CM2001" manufactured by Toray Industries Inc., polyamide-1 (PA-1)) of 10 parts by weight was dried at 120° C. under reduced pressure for 3 hours, further, as a compatible plasticizer, bisphenol A type epoxy resin ("Epicoat" 1004 manufactured by Yuka-Shell Epoxy Co., Ltd.) of 2 parts by weight was compounded to 100 parts by weight in total of the PPS resin and nylon 610, then charged in a co-rotational biaxial kneading extruder having a vent provided with three kneading paddle mixing parts being heated at 330° C. (manufactured by Japan Steel Works Ltd., screw diameter 30 mm, screw length/screw diameter=45.5), and melt extruded in a strand form by residence time of 90 seconds and screw rotation number of 300 rpm/min, cooled in water at 25° C., then immediately cut to produce a blend chip. A raw material that 0.3 wt % of calcium carbonate powder having an average particle diameter of 1.2 μm and 0.05 wt % of calcium stearate were added to 100 parts by weight of the blend chip of PPS/PA-1 (90/10 wt %) and uniformly dispersed/compounded raw material was dried at 150° C. under reduced pressure for 3 hours, and then fed to a uniaxial extruder of full-flight that the melt part was heated at 320° C.

Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film.

This unstretched polyphenylene sulfide film was stretched at 110° C. by 2.8 times in a longitudinal direction of film by using a longitudinal stretch machine constituted by a plurality of rolls heated and by utilizing circumferential velocity difference between rolls. Thereafter, the film edges were removed, thereby to produce a biaxially oriented polyphenylene sulfide film of 30 µm in thickness.

The measurement and evaluation results on the constitution and characteristic of the uniaxially oriented polyphenylene sulfide film obtained are shown in Table 1, and this uniaxially oriented polyphenylene sulfide film was excellent in molding processability, was somewhat inferior in heat resistance and acoustic properties, but was a level usable in practice.

Example 17

PPS resin produced in Reference example 1 of 90 parts by weight was dried at 180° C. under reduced pressure for 3 hours, as a thermoplastic resin (Y), nylon 610 resin (nylon resin, "Amilan CM2001" manufactured by Toray Industries Inc., polyamide-1 (PA-1)) of 10 parts by weight was dried at 120° C. under reduced pressure for 3 hours, further, as a compatible plasticizer, bisphenol A type epoxy resin ("Epicoat" 1004 manufactured by Yuka-Shell Epoxy Co., Ltd.) of 2 parts by weight was compounded to 100 parts by weight in total of the PPS resin and nylon 610, then charged in a co-rotational biaxial kneading extruder having a vent provided with three kneading paddle mixing parts being heated at 330° C. (manufactured by Japan Steel Works Ltd., screw diameter 30 mm, screw length/screw diameter=45.5), and melt extruded in a strand form by residence time of 90 seconds and screw rotation number of 300 rpm/min, cooled in water at 25° C., then immediately cut to produce a blend chip. A raw material that 0.3 wt % of calcium carbonate powder having an average particle diameter of 1.2 µm and 0.05 wt % of calcium stearate were added to 100 parts by weight of the blend chip of PPS/PA-1 (90/10 wt %) and uniformly dispersed/compounded raw material was dried at 150° C. under reduced pressure for 3 hours, and then fed to a uniaxial extruder of full-flight that the melt part was heated at 320° C.

Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film. The measurement and evaluation results on the constitution and characteristic of the unoriented polyphenylene sulfide film obtained are shown in Table 1, and this unoriented polyphenylene sulfide film was somewhat inferior in molding processability, heat resistance and acoustic properties, but was a level usable in practice.

Examples 18, 19

A biaxially oriented polyphenylene sulfide film was obtained in the same manner as in Example 3 except that film thickness of the biaxially oriented polyphenylene sulfide film was changed as shown in Table 1. The measurement and evaluation results on the constitution and characteristic of the biaxially oriented polyphenylene sulfide film obtained were shown in Table 1. The biaxially oriented polyphenylene sulfide film obtained in Example 18 was somewhat inferior in molding processability, but was a level usable in practice, and was excellent in heat resistance and acoustic properties. The biaxially oriented polyphenylene sulfide film obtained in Example 19 was somewhat inferior in acoustic properties, but was a level usable in practice, and was excellent in molding processability and heat resistance.

Comparative Example 1

A biaxially oriented polyphenylene sulfide film was obtained in the same manner as in Example 1 except that draw ratio in the film forming condition of biaxially oriented polyphenylene sulfide film was changed as shown in Table 1. The biaxially oriented polyphenylene sulfide film obtained in the present Comparative example was excellent in heat resistance, somewhat inferior in acoustic properties, but was a level usable in practice, and insufficient in molding processability because it was lacking in elongation at break.

Comparative Example 2

A raw material that 0.3 wt % of calcium carbonate powder having an average particle diameter of 1.2 µm and 0.05 wt % of calcium stearate were added to 100 parts by weight of the PPS resin produced in Reference example 1 and uniformly dispersed/compounded raw material was dried at 150° C. under reduced pressure for 3 hours, and then fed to a uniaxial extruder of full-flight that the melt part was heated at 320° C. Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film. The unstretched polyphenylene sulfide film obtained in the present Comparative example was lacking in elongation at break, inferior in molding processability, and also insufficient in acoustic properties and heat resistance.

Comparative Example 3

A biaxially oriented polyphenylene sulfide film was obtained in the same manner as in Example 3 except that the added amount of PA-1 as a thermoplastic resin (Y) was changed as shown in Table 1. The measurement and evaluation results on the constitution and characteristic of the biaxially oriented polyphenylene sulfide film obtained were shown in Table 1. The biaxially oriented polyphenylene sulfide film obtained in the present Comparative example was inferior in molding processability and acoustic properties due to low Young' modulus, and also insufficient in heat resistance.

Comparative Example 4

A biaxially oriented polyphenylene sulfide film was obtained in the same manner as in Example 9 except that the added amount of PEI as a thermoplastic resin (Y) was changed as shown in Table 1. The measurement and evaluation results on the constitution and characteristic of the biaxially oriented polyphenylene sulfide film obtained were shown in Table 1. The biaxially oriented polyphenylene sulfide film obtained was insufficient in molding processability and acoustic properties.

Comparative Example 5

PEN chip of 100 parts by weight produced in Reference example 3 was dried at 180° C. under reduced pressure for 3 hours, and then fed to a uniaxial extruder of full-flight that the melt part was heated at 320° C.

Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched PEN film.

This unstretched PEN film was stretched at 140° C. by 4.0 times in a longitudinal direction of film by using a longitudinal stretch machine constituted by a plurality of rolls heated and by utilizing circumferential velocity difference between rolls. Thereafter, this film was introduced to a tenter while holding both ends by clips, stretched at a draw temperature of 145° C. by a draw ratio of 4.0 in a width direction of film, followed by heat treatment at a temperature of 265° C. for 4 seconds, then subjected to a 5% relaxing treatment in a lateral direction in a cool zone controlled at 150° C., cooled to room temperature, and the film edges were removed, thereby to produce a biaxially oriented PEN film of 30 μm in thickness.

The measurement and evaluation results on the constitution and characteristic of the biaxially oriented polyphenylene sulfide film obtained are shown in Table 1, and this biaxially oriented PEN film was excellent in heat resistance and acoustic properties, but lacking in elongation at break, and inferior in molding processability.

TABLE 1

| | Polyarylene sulfide | | Thermoplastic resin (Y) | | Compatible plasticizer | | Film-forming condition | | | | | Existence of siloxane bond | Glass transition temperature (°C.) | Elongation at break MD/TD (%) | Young's modulus MD/TD | Molding processability 1 | Heat resistance | Acoustic property |
|---|---|---|---|---|---|---|---|---|---|---|---|---|---|---|---|---|---|---|
| | Kind | Content (part by weight) | Kind | Content (part by weight) | Kind | Content (part by weight) | Orientation state of film | Draw ratio (MD/TD) | Heat-set temperature (°C.) | Relaxing treatment in TD direction (%) | Film thickness (μm) | | | | | | | |
| Example 1 | PPS | 100 | None | — | — | — | Biaxial orientation | 3.3/3.3 | 265 | 5 | 30 | — | 93 | 105/115 | 3.3/3.2 | ○ | ◎ | ○ |
| Example 2 | PPS | 100 | None | — | — | — | Biaxial orientation | 3.7/3.5 | 265 | 5 | * | — | 93 | 90/110 | 3.6/3.5 | ○ | ◎ | ○ |
| Example 3 | PPS | 90 | PA-1 | 10 | C1 | 0.5 | Biaxial orientation | 2.8/2.8 | 265 | 5 | * | ○ | 93 | 150/165 | 2.4/2.6 | ◎ | ◎ | ◎ |
| Example 4 | PPS | 70 | PA-1 | 30 | C1 | 1.5 | Biaxial orientation | 2.8/2.8 | 235 | 5 | * | ○ | 93 | 160/170 | 2.3/2.4 | ◎ | ◎ | ◎ |
| Example 5 | PPS | 56 | PA-1 | 45 | C1 | 2 | Biaxial orientation | 2.9/2.8 | 265 | 5 | * | ○ | 93 | 175/190 | 1.8/1.8 | ◎ | ○ | ◎ |
| Example 6 | PPS | 97 | PA-1 | 3 | C1 | 0.3 | Biaxial orientation | 2.8/2.8 | 265 | 5 | * | ○ | 93 | 110/120 | 2.6/2.8 | ○ | ◎ | ◎ |
| Example 7 | PPS | 90 | PA-2 | 10 | C1 | 0.5 | Biaxial orientation | 2.8/2.8 | 265 | 5 | * | ○ | 93 | 145/160 | 2.6/2.7 | ◎ | ◎ | ◎ |
| Example 8 | PPS | 90 | PA-3 | 10 | C1 | 0.5 | Biaxial orientation | 2.8/2.8 | 265 | 5 | * | ○ | 93 | 140/155 | 2.6/2.7 | ◎ | ◎ | ◎ |
| Example 9 | PPS | 90 | PEI | 10 | C1 | 0.5 | Biaxial orientation | 2.8/2.8 | 265 | 5 | * | ○ | 93 | 145/155 | 2.7/2.8 | ◎ | ◎ | ◎ |
| Example 10 | PPS | 90 | PEI | 5 | C1 | 0.3 | Biaxial orientation | 2.8/2.8 | 266 | 5 | * | ○ | 93 | 150/180 | 2.6/2.7 | ◎ | ◎ | ◎ |
| Example 11 | PPS | 90 | PEI | 15 | C1 | 1 | Biaxial orientation | 2.8/2.8 | 265 | 5 | * | ○ | 93 | 80/100 | 2.9/2.9 | ○ | ◎ | ◎ |
| Example 12 | PPS | 90 | PEI | 10 | C2 | 0.5 | Biaxial orientation | 3.0/3.0 | 265 | 5 | * | ○ | 93 | 130/80 | 2.7/3.0 | ○ | ◎ | ◎ |
| Example 13 | PPS | 90 | PEI | 10 | C1 | 0.5 | Biaxial orientation | 2.8/2.8 | 265 | 5 | * | X | 93 | 70/100 | 2.6/2.7 | △ | ◎ | ◎ |
| Example 14 | PPS | 90 | PES | 10 | C1 | 0.5 | Biaxial orientation | 2.8/2.8 | 265 | 5 | * | ○ | 93 | 135/140 | 2.7/2.7 | ◎ | ◎ | ◎ |
| Example 15 | PPS | 90 | PSF | 10 | C1 | 0.5 | Biaxial orientation | 2.8/2.8 | 265 | 5 | * | ○ | 93 | 135/140 | 2.6/2.6 | ◎ | ◎ | ◎ |
| Example 16 | PPS | 90 | PA-1 | 10 | C2 | 2 | Uniaxial orientation | only MD 3.3 | — | — | * | X | 91 | 130/105 | 2.1/1.7 | ○ | ○ | ◎ |
| Example 17 | PPS | 90 | PA-1 | 10 | C2 | 2 | Non-orientation | — | — | — | * | X | 90 | 105/105 | 1.5/1.5 | ○ | ○ | ○ |
| Example 18 | PPS | 90 | PA-1 | 10 | C1 | 0.5 | Biaxial orientation | 2.8/2.8 | 265 | 5 | 10 | ○ | 93 | 100/110 | 2.6/2.6 | ◎ | ◎ | ◎ |
| Example 19 | PPS | 90 | PA-1 | 10 | C1 | 0.5 | Biaxial orientation | 2.8/2.8 | 265 | 5 | 100 | ○ | 93 | 135/140 | 2.3/2.3 | ○ | ◎ | ○ |
| Comparative Example 1 | PPS | 100 | None | — | — | — | Biaxial orientation | 4.0/4.0 | 265 | 5 | 30 | — | 93 | 80/90 | 3.8/3.8 | △ | ◎ | ○ |

TABLE 1-continued

| | | | | | | | | | | | | | | | | |
|---|---|---|---|---|---|---|---|---|---|---|---|---|---|---|---|---|
| Comparative Example 2 | PPS | 100 | None | — | — | — | Non-orientation | — | — | — | * | — | 90 | 4/4 | 1.6/1.6 | X | X | X |
| Comparative Example 3 | PPS | 40 | PA-1 | 60 | C1 | 3 | Biaxial orientation | 2.8/2.8 | 265 | 5 | * | ○ | 93 | 180/190 | 1.4/1.3 | X | X | X |
| Comparative Example 4 | PPS | 90 | PEI | 50 | C1 | 2.5 | Biaxial orientation | 2.8/2.8 | 265 | 5 | * | ○ | 93 | 60/40 | 2.6/2.8 | X | ◎ | X |
| Comparatve Example 5 | PEN | 100 | — | — | — | — | Biaxial orientation | 4.0/4.0 | 260 | 4 | * | — | 120 | 80/80 | 6.0/6.0 | X | ◎ | ◎ |

Remarks:
MD: longitudinal direction of film,
TD: width direction of film
PEI: Polyetherimide
PES: Polyether sulfone
PSF: Polysulfone
PEN: Polyethylene-2,6-nephthalate
C1: Isocyanatesilane (K8E9007)
C2: Epicoat (1004)

Example 20

PPS resin produced in Reference example 1 of 80 parts by weight and calcium carbonate of 20 parts by weight having a particle diameter of 1.2 μm as an inert particle were compounded and charged in a co-rotational biaxial kneading extruder having a vent being heated at 300° C. (manufactured by Japan Steel Works Ltd., screw diameter 30 mm, screw length/screw diameter=45.5), and melt extruded in a strand form by residence time of 90 seconds and screw rotation number of 300 rpm/min, cooled in water at 25° C., then immediately cut to produce a 20 wt % particle master chip.

Next, using 50 parts by weight of PPS resin produced in Reference example 1 and 10 parts by weight of polyetherimide ("Ultem 1010" manufactured by GE Plastics Corporation) (PEI) as a thermoplastic resin (Y), as a compatible plasticizer, 0.375 wt % of γ-isocyanatepropyltriethoxysilane ("KBE9007" manufactured by Shin-Etsu Chemical co., Ltd.) relative to the whole polymer was compounded, and these were charged in a co-rotational biaxial kneading extruder having a vent being heated at 300° C. (manufactured by Japan Steel Works Ltd., screw diameter 30 mm, screw length/screw diameter=45.5), and melt extruded in a strand form by residence time of 90 seconds and screw rotation number of 300 rpm/min, cooled in water at 25° C., then immediately cut to produce a blend chip. Sixty parts by weight of the blend chip raw material of PPS/PEI (16.7 wt %) and 50 parts by weight of the 20 wt % particle master chip previously produced were compounded, dried at 150° C. under reduced pressure for 3 hours, thereafter, 0.05 wt % of calcium stearate was added relative to the whole chip, and fed to a uniaxial extruder of full-flight that the melt part was heated at 320° C. Next, the polymer melted by the extruder was filtered trough a filter whose temperature was set at 320° C., melt-extruded from a T-die set at 320° C., and then closely contacted on a cast drum of surface temperature at 25° C. while applying static charge thereon to be cooled and solidified, thereby to produce an unstretched polyphenylene sulfide film.

This unstretched polyphenylene sulfide film was stretched at 110° C. by 2.8 times in a longitudinal direction of film by using a longitudinal stretch machine constituted by a plurality of rolls heated and by utilizing circumferential velocity difference between rolls. Thereafter, this film was introduced to a tenter while holding both ends by clips, stretched at a draw temperature of 110° C. by a draw ratio of 3.0 in a width direction of film, followed by heat treatment at a temperature of 265° C. for 5 seconds, then subjected to a 3% relaxing treatment in a lateral direction in a cool zone controlled at 150° C., cooled to room temperature, and the film edges were removed, thereby to produce a biaxially oriented polyphenylene sulfide film of 30 μm in thickness containing 10 parts by weight of calcium carbonate particle relative to 100 parts by weight of the whole polymer.

The measurement and evaluation results on the constitution and characteristic of the biaxially oriented polyphenylene sulfide film obtained are shown in Table 2, and this biaxially oriented polyphenylene sulfide film was excellent in heat molding processability.

Examples 21, 22, 23

A biaxially oriented polyphenylene sulfide film was obtained in the same manner as in Example 20 except that the added amount of polyetherimide as a thermoplastic resin (Y) relative to the whole polymer was changed as shown in Table 2. The measurement and evaluation results on the constitution and characteristic of the biaxially oriented polyphenylene sulfide film obtained were shown in Table 2. The biaxially oriented polyphenylene sulfide film obtained in Example 21 was excellent in heat molding processability. Regarding the biaxially oriented polyphenylene sulfide film obtained in Example 22, when it was heat molded at 180° C., breakage of film occurred, but when it was heat molded at 230° C., no breakage of film occurred and it was able to be formed. Taking-out after molding and shape retention property were good both at 100° C. and 120° C. Regarding the biaxially oriented polyphenylene sulfide film obtained in Example 23, when it was heat molded at 180° C., breakage of film occurred, but when it was heat molded at 230° C., no breakage of film occurred and it was able to be molded. Taking-out after molding and shape retention property were good both at 100° C. and 120° C.

Example 24

A biaxially oriented polyphenylene sulfide film was obtained in the same manner as in Example 20 except that calcium carbonate having a particle diameter of 0.6 μm was used as an inert particle. The measurement and evaluation results on the constitution and characteristic of the biaxially oriented polyphenylene sulfide film obtained are shown in Table 2, and the film was excellent in heat moldability.

Example 25

A biaxially oriented polyphenylene sulfide film was obtained in the same manner as in Example 20 except that the content of calcium carbonate as an inert particle was set to 3 parts by weight relative to 100 parts by weight of the whole polymer. The measurement and evaluation results on the constitution and characteristic of the biaxially oriented polyphenylene sulfide film obtained are shown in Table 2, and the film was excellent in heat moldability.

Example 26

A biaxially oriented polyphenylene sulfide film was obtained in the same manner as in Example 20 except that silica of 0.6 μm was used as an inert particle. The measurement and evaluation results on the constitution and characteristic of the biaxially oriented polyphenylene sulfide film obtained are shown in Table 2, and the film was excellent in heat molding.

Example 27

A biaxially oriented polyphenylene sulfide film was obtained in the same manner as in Example 1 except that as a thermoplastic resin (Y), nylon 610 resin (nylon resin, "Amilan CM2001" manufactured by Toray Industries Inc) was used. The measurement and evaluation results on the constitution and characteristic of the biaxially oriented polyphenylene sulfide film obtained are shown in Table 2, and when the film was heat molded at 180° C., breakage of film occurred, but when it was heat molded at 230° C., no breakage of film occurred and it was able to be molded. Taking-out after molding and shape retention property were good both at 100° C. and 120° C.

Example 28

A biaxially oriented polyphenylene sulfide film was obtained in the same manner as in Example 20 except that the content of calcium carbonate powder having an average particle diameter of 1.2 μm was set to 3 parts by weight. The measurement and evaluation results on the constitution and characteristic of the biaxially oriented polyphenylene sulfide film obtained are shown in Table 2, and when the film was heat molded both at 180° C. and 230° C., no breakage of film occurred, but the demolding property after heat molding at 120° C. was bad.

Comparative Example 6

A biaxially oriented polyphenylene sulfide film was obtained in the same manner as in Example 20 except that as a thermoplastic resin (Y), polysulfone ("UDEL" manufactured by Amoco Corporation) (PSF) was used. The measurement and evaluation results on the constitution and characteristic of the biaxially oriented polyphenylene sulfide film obtained are shown in Table 2, and when the film was heat molded at 180° C., breakage of film occurred, but when it was heat molded at 230° C., no breakage of film occurred and it was able to be molded. Further, taking-out property after molding and shape retention property were good Comparative Example 7

A biaxially oriented polyphenylene sulfide film was obtained in the same manner as in Example 20 except that draw ratio in the film-forming condition of biaxially oriented polyphenylene sulfide film was set to 3.9×3.4. The measurement and evaluation results on the constitution and characteristic of the biaxially oriented polyphenylene sulfide film obtained are shown in Table 2, and when the film was heat molded at 180° C., breakage of film occurred, but when it was heat molded at 230° C., no breakage of film occurred and it was able to be molded. Taking-out after molding and shape retention property were good both at 100° C. and 120° C.

Comparative Example 8

An unoriented polyphenylene sulfide film was produced in the same manner as in Example 20 except that 0.3 parts by weight of calcium carbonate powder having an average particle diameter of 1.2 μm was added to 100 parts by weight of the PPS resin produced in Reference example 1. Next, a biaxially oriented polyphenylene sulfide film was obtained in the same manner as in Example 1 except that draw ratio in the film-forming condition was set to 3.9×3.4. The measurement and evaluation results on the constitution and characteristic of the biaxially oriented polyphenylene sulfide film obtained are shown in Table 2, and because of low elongation at break, breakage of film occurred when the film was heat molded both at 180° C. and 230° C.

Comparative Example 9

A biaxially oriented polyphenylene sulfide film was obtained in the same manner as in Example 20 except that 10 parts by weight of calcium carbonate powder having an average particle diameter of 1.2 μm was used to 90 parts by weight of the PPS resin produced in Reference example 1. The measurement and evaluation results on the constitution and characteristic of the biaxially oriented polyphenylene sulfide film obtained are shown in Table 2, and because of low elongation at break, breakage of film occurred when the film was heat molded both at 180° C. and 230° C.

TABLE 2

| | Polyarylene sulfide | | Thermoplastic resin (Y) | | | | Compatible plasticizer | | Inert particle | | | Film-forming condition Draw ratio MD/TD |
|---|---|---|---|---|---|---|---|---|---|---|---|---|
| | Kind | Content to whole polymer (part by weight %) | Kind | Content to whole polymer (part by weight %) | Existance of siloxane bond | Average dispersion diameter (μm) | Kind | Content (part by weight) | Kind | Content to 100 parts by weight of whole polymer (part by weight) | Particle diameter (μm) | |
| Example 20 | PPS | 90 | C1 | 10 | ○ | 0.25 | C1 | 0.375 | Calium carbonate | 10 | 1.2 | 2.8>3.2 |
| Example 21 | PPS | 85 | C1 | 15 | ○ | 0.35 | C1 | 1.0 | Calcium carbonate | 10 | 1.2 | 2.8>3.2 |
| Example 22 | PPS | 95 | C1 | 5 | ○ | 0.15 | C1 | 0.375 | Calcium carbonate | 10 | 1.2 | 2.8>3.2 |
| Example 23 | PPS | 97 | C1 | 3 | ○ | 0.15 | C1 | 0.275 | Calcium carbonate | 10 | 1.2 | 2.8>3.2 |
| Example 24 | PPS | 90 | C1 | 10 | ○ | 0.25 | C1 | 0.375 | Calcium carbonate | 10 | 0.6 | 2.8>3.2 |
| Example 25 | PPS | 90 | C1 | 10 | ○ | 0.25 | C1 | 0.375 | Calcium carbonate | 3 | 1.2 | 2.8>3.2 |
| Example 26 | PPS | 90 | C1 | 10 | ○ | 0.25 | C1 | 0.375 | Silica | 10 | 0.6 | 2.8>3.2 |
| Example 27 | PPS | 90 | C1 | 10 | ○ | 0.25 | C1 | 0.375 | Calcium carbonate | 10 | 1.2 | 2.8>3.2 |
| Example 28 | PPS | 90 | C1 | 10 | ○ | 0.25 | C1 | 0.375 | Calcium carbonate | 0.3 | 1.2 | 2.8>3.2 |
| Comparative Example 6 | PPS | 90 | C1 | 10 | ○ | 0.75 | C1 | 0.375 | Calcium carbonate | 10 | 1.2 | 2.8>3.2 |
| Comparative Example 7 | PPS | 90 | C1 | 10 | ○ | 0.40 | C1 | 0.375 | Calcium carbonate | 10 | 1.2 | 3.9>3.4 |
| Comparative Example 8 | PPS | 100 | — | — | — | — | C1 | 0.375 | — | — | — | 3.9>3.4 |
| Comparative Example 9 | PPS | 90 | — | — | — | — | C1 | 0.375 | Cacium carbonate | 10 | 1.2 | 2.8>3.2 |

| | Glass transition temperature (° C.) | Room temperature Elongation at break MD/TD (%) | Mechanical property (120° C.) | | Heat moldability | | | Taking-out property after molding and shape retention property | | |
|---|---|---|---|---|---|---|---|---|---|---|
| | | | Elongation at break (%) | Young's modulus (GPA) | 180° C. | 230° C. | | 100° C. | 120° C. | |
| Example 20 | 93 | 105/75 | 200 | 1.2 | ○ | ○ | | ○ | ○ | |
| Example 21 | 93 | 100/70 | 195 | 1.3 | ○ | ○ | | ○ | ○ | |
| Example 22 | 93 | 120/90 | 160 | 0.8 | X | ○ | | ○ | ○ | |
| Example 23 | 93 | 100/70 | 150 | 0.5 | X | ○ | | ○ | ○ | |
| Example 24 | 93 | 100/70 | 135 | 1.0 | ○ | ○ | | ○ | ○ | |
| Example 25 | 93 | 110/80 | 195 | 0.8 | ○ | ○ | | ○ | ○ | |
| Example 26 | 93 | 105/75 | 190 | 1.0 | ○ | ○ | | ○ | ○ | |
| Example 27 | 93 | 110/80 | 200 | 0.9 | X | ○ | | ○ | ○ | |

TABLE 2-continued

| | | | | | | |
|---|---|---|---|---|---|---|
| Example 28 | 93 | ○ | 130/90 | 190 | 0.8 | ○ ○ ○ ○ ○ × ○ |
| Comparative Example 6 | 93 | ○ | 60/80 | 190 | 1.0 | × ○ ○ ○ ○ |
| Comparative Example 7 | 93 | ○ | 60/80 | 140 | 1.3 | × ○ ○ ○ |
| Comparative Example 8 | 93 | — | 60/80 | 120 | 1.2 | × * * — — |
| Comparative Example 9 | 93 | — | 50/40 | 100 | 0.9 | × * * — — |

Remarks:
PEI: Polyecherimode
H610: Nylon 610
P5F: Polysulfone
C1: Isocyanaresilane (KBE9007)
C2: Epicot (1094)

INDUSTRIAL APPLICABILITY

The polyarylene sulfide film of the present invention can be preferably used as a film for an acoustic instrument vibrating plate constituting various acoustic instruments, that is, speakers.

The invention claimed is:

1. A polyarylene sulfide film comprising: polyarylene sulfide and polyetherimide resin, wherein the content of the polyetherimide resin is 1 to 40 parts by weight based on 100 parts by weight of the sum content of the polyarylene sulfide and the polyetherimide resin, the elongation at break at 23 degrees Celsius and humidity 65% RH in either a longitudinal direction or a width direction of the film is 100% or more and 250% or less, and the Young's modulus at 23 degrees Celsius and humidity 65% RH in either a longitudinal direction or a width direction of the film is 1.5 GPa or more and less than 4 GPa.

2. The polyarylene sulfide film of claim 1, further comprising inert particles in an amount of 0.6 to 30 parts by weight relative to 100 parts by weight of all polymers constituting the film.

3. The polyarylene sulfide film of claim 1, wherein the average dispersion diameter of the polyetherimide is 0.01 to 2 μm.

4. The polyarylene sulfide film of claim 1, wherein the average dispersion diameter of the polyetherimide is 0.05 to 0.5 μm.

5. The polyarylene sulfide film of claim 1, further comprising an alkoxysilane that forms a siloxane bond at the interface of a dispersed phase of the polyetherimide.

6. The polyarylene sulfide film of claim 2, wherein the inert particles are selected from calcium carbonate and silica.

7. The polyarylene sulfide film of claim 6, wherein the content of the inert particles is 5 to 20 parts by weight relative to 100 parts by weight of all polymers constituting the film.

8. The polyarylene sulfide film of claim 6, wherein the content of the inert particles is 1 to 10 parts by weight relative to 100 parts by weight of all polymers constituting the film.

* * * * *